US012591120B2

(12) United States Patent
Tang et al.

(10) Patent No.: US 12,591,120 B2
(45) Date of Patent: *Mar. 31, 2026

(54) IMAGE CAPTURING LENS SYSTEM, IMAGE CAPTURING UNIT AND ELECTRONIC DEVICE

(71) Applicant: LARGAN PRECISION CO., LTD., Taichung City (TW)

(72) Inventors: Hsiang-Chi Tang, Taichung City (TW); Tzu-Chieh Kuo, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 534 days.

This patent is subject to a terminal disclaimer.

(21) Appl. No.: 18/114,751

(22) Filed: Feb. 27, 2023

(65) Prior Publication Data

US 2023/0244067 A1 Aug. 3, 2023

Related U.S. Application Data

(63) Continuation of application No. 17/066,414, filed on Oct. 8, 2020, now Pat. No. 11,630,289.

(30) Foreign Application Priority Data

Sep. 9, 2020 (TW) ................................. 109130939

(51) Int. Cl.
*G02B 15/14* (2006.01)
*G02B 13/00* (2006.01)
(Continued)

(52) U.S. Cl.
CPC ....... *G02B 15/143* (2019.08); *G02B 13/0045* (2013.01); *G02B 13/009* (2013.01);
(Continued)

(58) Field of Classification Search
CPC .................. G02B 13/0045; G02B 9/60; G02B 15/143103; G02B 15/143107;
(Continued)

(56) References Cited

U.S. PATENT DOCUMENTS 4,721,371 A 1/1988 Imai
4,999,007 A 3/1991 Aoki et al.
(Continued)

FOREIGN PATENT DOCUMENTS

CN 103744167 A 4/2014
CN 109001897 A 12/2018
(Continued)

*Primary Examiner* — Balram T Parbadia
*Assistant Examiner* — Alex Park Rickel
(74) *Attorney, Agent, or Firm* — Maschoff Brennan

(57) ABSTRACT

An image capturing lens system includes three lens groups including five lens elements. The three lens groups are, in order from an object side to an image side: first, second and third lens groups. The five lens elements are, in order from the object side to the image side: first, second, third, fourth and fifth lens elements. The first lens element has an object-side surface being convex in a paraxial region thereof. The second lens element has negative refractive power. At least one lens element has an inflection point. A focal length of the image capturing lens system is varied by changing axial distances between the three lens groups in a zooming process. The image capturing lens system has a long-focal-length end and a short-focal-length end. The second lens group is moved relative to the first lens group along an optical axis in the zooming process.

20 Claims, 20 Drawing Sheets

(51) Int. Cl.

| | | |
|---|---|---|
| *G02B 15/20* | (2006.01) | |
| *G03B 5/00* | (2021.01) | |
| *G03B 30/00* | (2021.01) | |

(52) U.S. Cl.
CPC ............... *G02B 15/143503* (2019.08); *G02B 15/143507* (2019.08); *G02B 15/20* (2013.01); *G03B 5/00* (2013.01); *G03B 30/00* (2021.01); *G02B 13/0065* (2013.01); *G03B 2205/0046* (2013.01)

(58) Field of Classification Search
CPC .... G02B 15/143503; G02B 15/143507; G02B 15/20; G02B 13/009; G02B 13/0065; G03B 5/00; G03B 30/00; G03B 2205/0046
See application file for complete search history.

(56) References Cited

U.S. PATENT DOCUMENTS

| | | | |
|---|---|---|---|
| 5,268,792 | A | 12/1993 | Kreitzer et al. |
| 5,270,863 | A | 12/1993 | Uzawa |
| 5,570,234 | A | 10/1996 | Shibata |
| 5,642,230 | A | 6/1997 | Iwata et al. |
| 5,734,509 | A | 3/1998 | Ueno |
| 5,749,008 | A | 5/1998 | Ishihara et al. |
| 5,872,660 | A | 2/1999 | Kohno et al. |
| 5,982,544 | A | 11/1999 | Ogata |
| 5,999,330 | A | 12/1999 | Goosey |
| 6,064,531 | A | 5/2000 | Ishii et al. |
| 6,191,896 | B1 | 2/2001 | Itoh |
| 6,236,522 | B1 | 5/2001 | Shimizu |
| 2005/0141101 | A1 | 6/2005 | Itoh |
| 2017/0199360 | A1 | 7/2017 | Chang |
| 2018/0348485 | A1 | 12/2018 | Shi |
| 2021/0063704 | A1* | 3/2021 | Son ..................... G02B 13/0045 |
| 2021/0067667 | A1* | 3/2021 | Yang ..................... G02B 27/646 |
| 2022/0113491 | A1* | 4/2022 | Shim ..................... G02B 15/143 |
| 2023/0333357 | A1* | 10/2023 | Shim .............. G02B 15/143503 |

FOREIGN PATENT DOCUMENTS

| | | | |
|---|---|---|---|
| JP | S63292106 | A | 11/1988 |
| JP | 1989044907 | U1 | 2/1989 |
| JP | H09113805 | A | 5/1997 |
| WO | 2022044675 | A1 | 3/2022 |

* cited by examiner

IMAGE CAPTURING LENS SYSTEM, IMAGE CAPTURING UNIT AND ELECTRONIC DEVICE

RELATED APPLICATIONS

This application is a continuation patent application of U.S. application Ser. No. 17/066,414, filed on Oct. 8, 2020, which claims priority to Taiwan Application 109130939, filed on Sep. 9, 2020, which is incorporated by reference herein in its entirety.

BACKGROUND

Technical Field

The present disclosure relates to an image capturing lens system, an image capturing unit and an electronic device, more particularly to an image capturing lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an image capturing lens system includes three lens groups, and the three lens groups include five lens elements. The three lens groups are, in order from an object side to an image side along an optical path, a first lens group, a second lens group and a third lens group. The five lens elements are, in order from the object side to the image side along the optical path, a first lens element, a second lens element, a third lens element, a fourth lens element and a fifth lens element. Each of the five lens elements has an object-side surface facing toward the object side and an image-side surface facing toward the image side.

The first lens group includes the first lens element and the second lens element, the second lens group includes the third lens element, and the third lens group includes the fourth lens element and the fifth lens element. The object-side surface of the first lens element is convex in a paraxial region thereof. The second lens element has negative refractive power. At least one lens element in the first lens group, the second lens group and the third lens group has at least one inflection point in an off-axis region thereof.

A focal length of the image capturing lens system is varied by changing axial distances between the three lens groups in a zooming process, and the image capturing lens system has a long-focal-length end and a short-focal-length end. The second lens group is moved relative to the first lens group along an optical axis in the zooming process, and the third lens group is moved relative to the first lens group along the optical axis in the zooming process.

When an Abbe number of one of the five lens elements is Vi, a refractive index of the one of the five lens elements is Ni, a minimum value of Vi/Ni is (Vi/Ni)min, half of a maximum field of view of the image capturing lens system at the short-focal-length end is HFOVS, a maximum distance between an optically effective area of the object-side surface of the first lens element and the optical axis when the image capturing lens system is at the long-focal-length end is Y11L, a maximum distance between an optically effective area of the object-side surface of the first lens element and the optical axis when the image capturing lens system is at the short-focal-length end is Y11S, a maximum distance between an optically effective area of the image-side surface of the fifth lens element and the optical axis when the image capturing lens system is at the long-focal-length end is Y52L, and a maximum distance between an optically effective area of the image-side surface of the fifth lens element and the optical axis when the image capturing lens system is at the short-focal-length end is Y52S, the following conditions are satisfied:

$$7.5 < (Vi/Ni)\mathrm{min} < 12.3;$$

$$5.0 \text{ degrees} < \mathrm{HFOVS} < 25.0 \text{ degrees};$$

$$0.50 < Y11L/Y52L < 2.0; \text{ and}$$

$$0.50 < Y11S/Y52S < 2.0.$$

According to another aspect of the present disclosure, an image capturing lens system includes three lens groups, and the three lens groups include five lens elements. The three lens groups are, in order from an object side to an image side along an optical path, a first lens group, a second lens group and a third lens group. The five lens elements are, in order from the object side to the image side along the optical path, a first lens element, a second lens element, a third lens element, a fourth lens element and a fifth lens element. Each of the five lens elements has an object-side surface facing toward the object side and an image-side surface facing toward the image side.

The object-side surface of the first lens element is convex in a paraxial region thereof. The second lens element has negative refractive power. At least one lens element in the first lens group, the second lens group and the third lens group has at least one inflection point in an off-axis region thereof.

A focal length of the image capturing lens system is varied by changing axial distances between the three lens groups in a zooming process, and the image capturing lens system has a long-focal-length end and a short-focal-length end. The second lens group is moved relative to the first lens group along an optical axis in the zooming process, and the third lens group is moved relative to the first lens group along the optical axis in the zooming process.

When an Abbe number of one of the five lens elements is Vi, a refractive index of the one of the five lens elements is Ni, a minimum value of Vi/Ni is (Vi/Ni)min, half of a maximum field of view of the image capturing lens system at the short-focal-length end is HFOVS, a maximum distance between an optically effective area of the object-side surface of the first lens element and the optical axis when the image capturing lens system is at the long-focal-length end is Y11L, a maximum distance between an optically effective area of the object-side surface of the first lens element and the optical axis when the image capturing lens system is at the short-focal-length end is Y11S, a maximum distance between an optically effective area of the image-side surface of the fifth lens element and the optical axis when the image capturing lens system is at the long-focal-length end is Y52L, a maximum distance between an optically effective area of the image-side surface of the fifth lens element and the optical axis when the image capturing lens system is at the short-focal-length end is Y52S, an axial distance between the object-side surface of the first lens element and an image surface when the image capturing lens system is at the long-focal-length end is TLL, and an axial distance between the object-side surface of the first lens element and the image surface when the image capturing lens system is at the short-focal-length end is TLS, the following conditions are satisfied:

$$7.5 < (Vi/Ni)\text{min} < 12.3;$$

$$5.0 \text{ degrees} < \text{HFOVS} < 25.0 \text{ degrees};$$

$$0.50 < Y11L/Y52L < 2.0;$$

$$0.50 < Y11S/Y52S < 2.0.$$

$$|TLL/TLS - 1| < 1.0E\text{-}2.$$

According to another aspect of the present disclosure, an image capturing lens system includes three lens groups, and the three lens groups include five lens elements. The three lens groups are, in order from an object side to an image side along an optical path, a first lens group, a second lens group and a third lens group. The five lens elements are, in order from the object side to the image side along the optical path, a first lens element, a second lens element, a third lens element, a fourth lens element and a fifth lens element. Each of the five lens elements has an object-side surface facing toward the object side and an image-side surface facing toward the image side.

The object-side surface of the first lens element is convex in a paraxial region thereof. The second lens element has negative refractive power. At least one lens element in the first lens group, the second lens group and the third lens group has at least one inflection point in an off-axis region thereof.

A focal length of the image capturing lens system is varied by changing axial distances between the three lens groups in a zooming process, and the image capturing lens system has a long-focal-length end and a short-focal-length end. The second lens group is moved relative to the first lens group along an optical axis in the zooming process.

When an Abbe number of one of the five lens elements is Vi, a refractive index of the one of the five lens elements is Ni, a minimum value of Vi/Ni is (Vi/Ni)min, half of a maximum field of view of the image capturing lens system at the short-focal-length end is HFOVS, a maximum distance between an optically effective area of the object-side surface of the first lens element and the optical axis when the image capturing lens system is at the long-focal-length end is Y11L, a maximum distance between an optically effective area of the object-side surface of the first lens element and the optical axis when the image capturing lens system is at the short-focal-length end is Y11S, a maximum distance between an optically effective area of the image-side surface of the fifth lens element and the optical axis when the image capturing lens system is at the long-focal-length end is Y52L, and a maximum distance between an optically effective area of the image-side surface of the fifth lens element and the optical axis when the image capturing lens system is at the short-focal-length end is Y52S, the following conditions are satisfied:

$$7.5 < (Vi/Ni)\text{min} < 12.3;$$

$$5.0 \text{ degrees} < \text{HFOVS} < 20.0 \text{ degrees};$$

$$0.50 < Y11L/Y52L < 2.0; \text{ and}$$

$$0.50 < Y11S/Y52S < 2.0.$$

According to another aspect of the present disclosure, an image capturing unit includes one of the aforementioned image capturing lens systems and an image sensor, wherein the image sensor is disposed on an image surface of the image capturing lens system.

According to another aspect of the present disclosure, an electronic device includes at least two image capturing units located on the same side of the electronic device. The at least two image capturing units include a first image capturing unit and a second image capturing unit. The first image capturing unit includes one of the aforementioned image capturing lens systems and an image sensor disposed on an image surface of the image capturing lens system. The second image capturing unit includes an optical lens assembly and an image sensor disposed on an image surface of the optical lens assembly. In addition, half of a maximum field of view of the second image capturing unit ranges between 30 degrees and 60 degrees.

BRIEF DESCRIPTION OF THE DRAWINGS

The disclosure can be better understood by reading the following detailed description of the embodiments, with reference made to the accompanying drawings as follows.

DETAILED DESCRIPTION

Figures 1, 2:
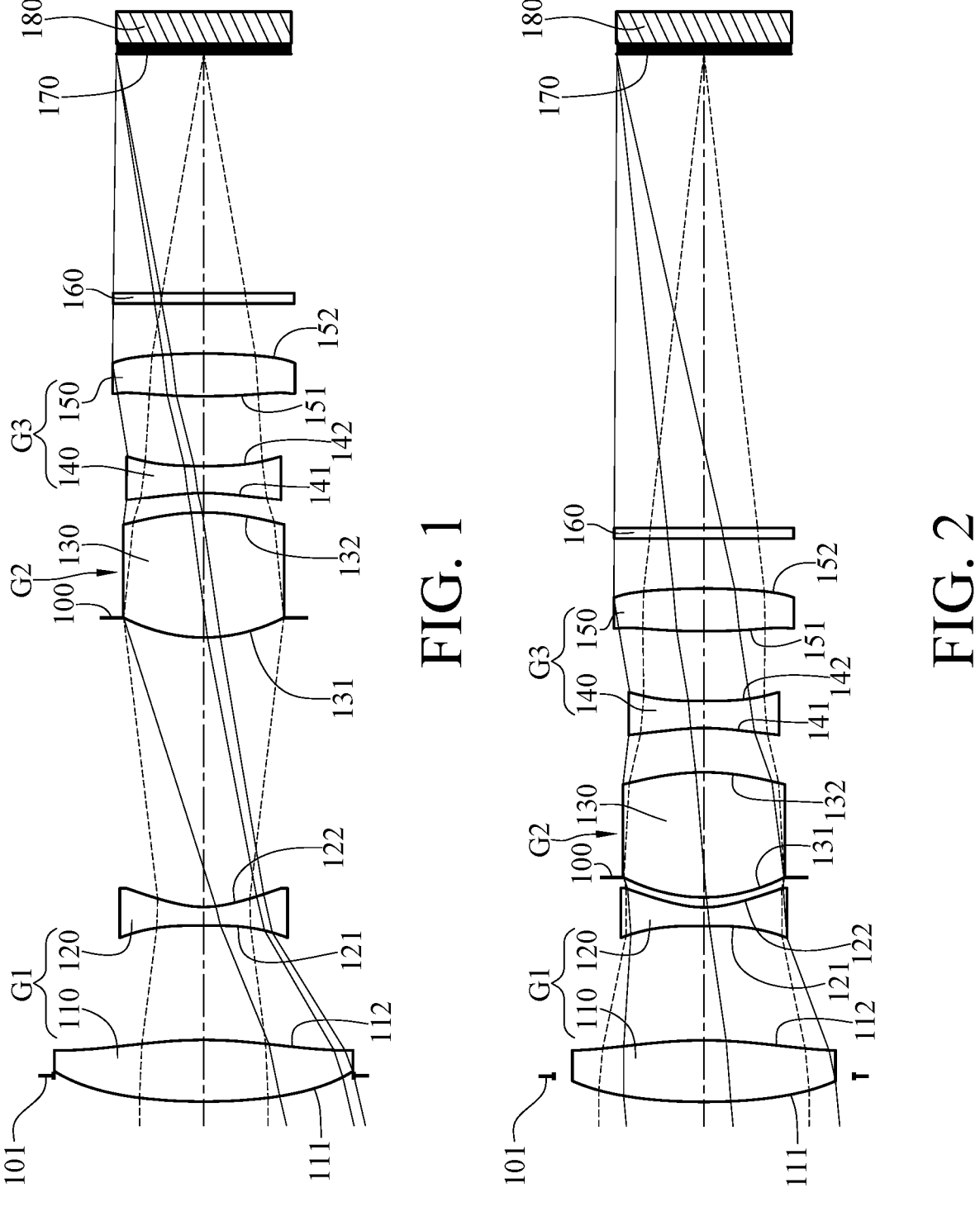
FIG. 1 is a schematic view of an image capturing unit at the short-focal-length end according to the 1st embodiment of the present disclosure.
FIG. 2 is a schematic view of the image capturing unit at the long-focal-length end according to the 1st embodiment of the present disclosure.

An image capturing lens system includes three lens groups, and the three lens groups include five lens elements. The three lens groups are, in order from an object side to an image side along an optical path, a first lens group, a second lens group and a third lens group. The five lens elements are, in order from the object side to the image side along the optical path, a first lens element, a second lens element, a third lens element, a fourth lens element and a fifth lens element. Each of the five lens elements has an object-side surface facing toward the object side and an image-side surface facing toward the image side. For instance, in one aspect, the first lens group includes the first lens element and the second lens element, the second lens group includes the third lens element, and the third lens group includes the fourth lens element and the fifth lens element.

According to the present disclosure, the focal length of the image capturing lens system is varied by changing axial distances between the three lens groups in a zooming process, and the image capturing lens system has a long-focal-length end and a short-focal-length end. Therefore, the configuration of three lens groups and five lens elements is favorable for balancing among the zoom ratio, image quality and difficulty of assembling. Please refer to FIG. 1 and FIG. 2, which are schematic views of an image capturing unit respectively at the short-focal-length end and the long-focal-length end according to the 1st embodiment of the present disclosure. Moreover, there is no relative motion between lens elements of one lens group in the zooming process (e.g., there is no relative motion between the lens elements of the first lens group). Therefore, it is favorable for simplifying the structure of the image capturing lens system.

The first lens group includes at least one lens element. Moreover, in one configuration where the first lens group includes two lens elements, it is favorable for reducing the outer diameter at the object side of the image capturing lens system and obtaining a telephoto configuration in the image capturing lens system. Moreover, the first lens group can have negative refractive power. Therefore, it is favorable for increasing the zoom ratio.

The second lens group includes at least one lens element. Moreover, in one configuration where the second lens group includes one lens element, it is favorable for balancing between the zoom ratio and image quality. Moreover, the second lens group is moved relative to the first lens group along an optical axis in the zooming process. Therefore, it is favorable for minimizing mechanical design restrictions of the image capturing lens system. Moreover, when the image capturing lens system is changing from the short-focal-length end to the long-focal-length end during the zooming process, the second lens group can be moved along the optical axis toward the object side relative to the first lens group. Therefore, it is favorable for increasing the zoom ratio. In addition, when the image capturing lens system is changing from the long-focal-length end to the short-focal-length end during the zooming process, the second lens group can be moved along the optical axis toward the image side relative to the first lens group. Moreover, the second lens group can have positive refractive power. Therefore, it is favorable for increasing the zoom ratio and reducing the outer diameter of the image capturing lens system.

The third lens group includes at least one lens element. Moreover, in one configuration where the third lens group includes two lens elements, it is favorable for providing consistent image quality during the zooming process. Moreover, the third lens group can be moved relative to the first lens group along the optical axis in the zooming process. Therefore, it is favorable for correcting aberrations generated during the zooming process and reducing the variation of the back focal length. Moreover, the image capturing lens system can focus on an object in a focusing process as an object distance varies, and the third lens group can be moved relative to the first lens group along the optical axis in the focusing process. Therefore, it is favorable for reducing the movement of lens groups in the focusing process. Moreover, when the object distance decreases in the focusing process, the third lens group can be moved along the optical axis toward the image side relative to the first lens group. Therefore, it is favorable for correcting aberrations, such as field curvature, generated during the focusing process.

According to the present disclosure, the image capturing lens system further includes an aperture stop, and the aperture stop can be disposed in the second lens group. Therefore, it is favorable for adjusting the relative position of the aperture stop during the zooming process so as to balance the image quality at each focal length of the image capturing lens system.

At least one lens group of the image capturing lens system can be moved along the optical axis so as to compensate temperature effect. Therefore, it is favorable for reducing the influence of temperature change on the image quality, so that the image capturing lens system is applicable to more applications. Moreover, the third lens group can be moved relative to the first lens group along the optical axis so as to compensate temperature effect. Therefore, it is favorable for minimizing the movement of lens groups.

At least one lens element in the first lens group, the second lens group and the third lens group can be made of plastic material. Therefore, it is favorable for reducing the system size and weight and increasing image quality and mass production efficiency. Moreover, there can be at least two lens elements in the first, second and third lens groups being made of plastic material. Moreover, there can be at least three lens elements in the first, second and third lens groups being made of plastic material. Moreover, there can be at least four lens elements in the first, second and third lens groups being made of plastic material.

Figures 21, 22:
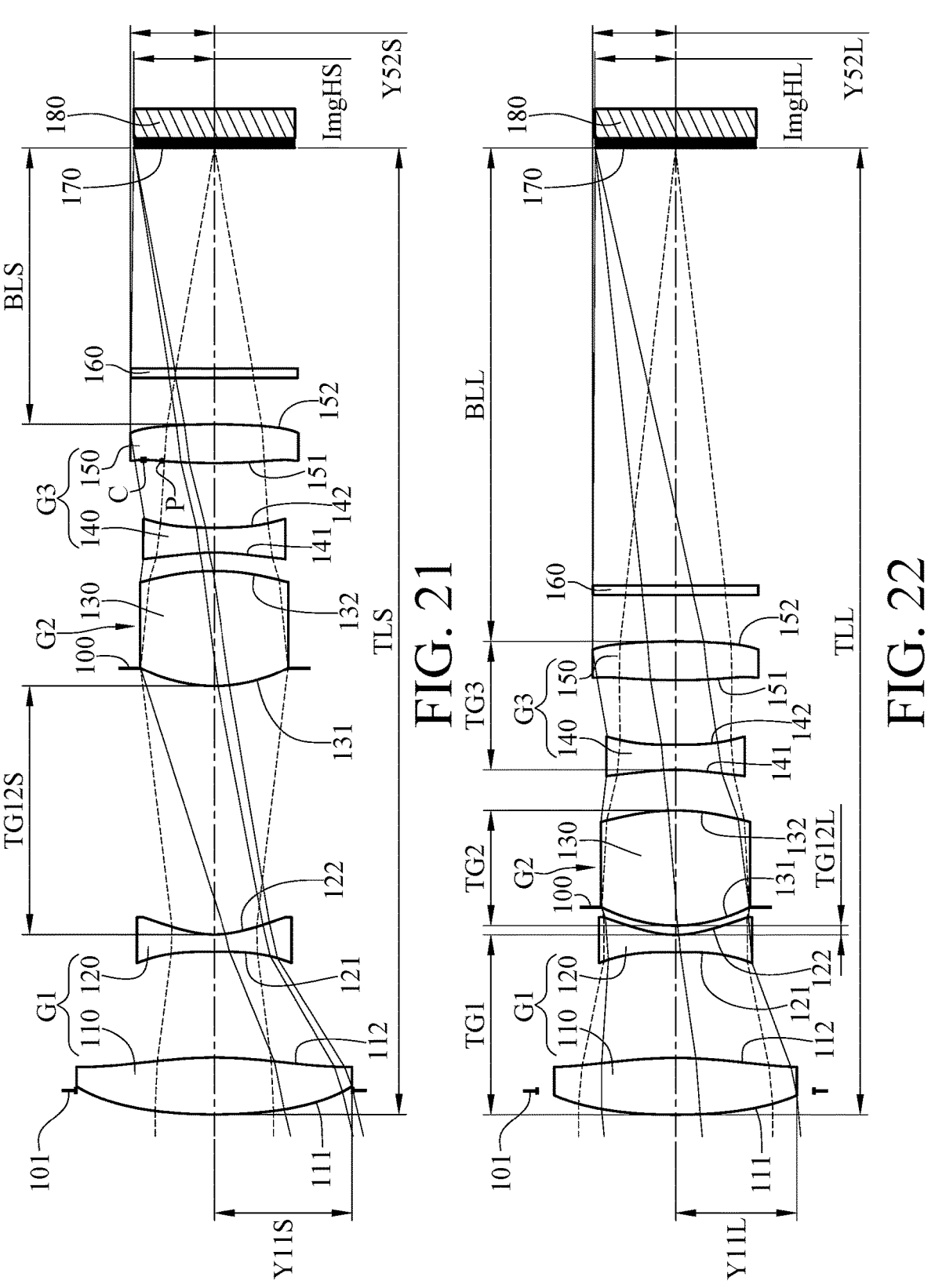
FIG. 21 shows a schematic view of Y11S, TG12S, TLS, BLS, ImgHS, Y52S and an inflection point and a critical point of the fifth lens element according to the 1st embodiment of the present disclosure.
FIG. 22 shows a schematic view of Y11L, TG12L, TLL, BLL, ImgHL, Y52L, TG1, TG2 and TG3 according to the 1st embodiment of the present disclosure.

At least one lens element in the first lens group, the second lens group and the third lens group has at least one inflection point in an off-axis region thereof. Therefore, it is favorable for increasing the shape variation of the lens element so as to miniaturize the lens element and improve image quality. Moreover, there can be at least two lens elements in the first, second and third lens groups each having at least one inflection point in an off-axis region thereof. Moreover, there can be at least three lens elements in the first, second and third lens groups each having at least one inflection point in an off-axis region thereof. Moreover, there can be at least four lens elements in the first, second and third lens groups each having at least one inflection point in an off-axis region thereof. Please refer to FIG. 21, which shows a schematic view of the inflection point P of the fifth lens element 150 according to the 1st embodiment of the present disclosure. The inflection point of the fifth lens element in FIG. 21 is only exemplary. In each embodiment, each of the lens elements can have one or more inflection points in an off-axis region thereof.

At least one lens element in the second lens group and the third lens group can have at least one critical point in an off-axis region thereof. Therefore, it is favorable for further increasing the shape variation of the lens element so as to miniaturize the image capturing lens system and correct aberrations. Please refer to FIG. 21, which shows a schematic view of the critical point C of the fifth lens element 150 according to the 1st embodiment of the present disclosure. The critical point of the fifth lens element in FIG. 21 is only exemplary. In each embodiment, each of the lens elements can have one or more critical points in an off-axis region thereof.

The object-side surface of the first lens element is convex in a paraxial region thereof. Therefore, it is favorable for increasing the zoom ratio and for light rays at different regions within the field of view to travel into the image capturing lens system evenly.

The second lens element has negative refractive power. Therefore, it is favorable for balancing the refractive power at the object side of the image capturing lens system so as to reduce aberrations such as spherical aberration. The image-side surface of the second lens element can be concave in a paraxial region thereof. Therefore, it is favorable for adjusting the surface shape and refractive power of the second lens element so as to correct aberrations such as astigmatism.

The third lens element can have positive refractive power. Therefore, it is favorable for increasing the zoom ratio. The object-side surface of the third lens element can be convex in a paraxial region thereof. Therefore, it is favorable for adjusting light travelling direction so as to increase the zoom ratio and reduce the outer diameter of the image capturing lens system. The image-side surface of the third lens element can be convex in a paraxial region thereof. Therefore, it is favorable for adjusting light travelling direction so as to increase the zoom ratio and reduce the outer diameter of the image capturing lens system.

When an Abbe number of the first lens element is V1, an Abbe number of the second lens element is V2, an Abbe number of the third lens element is V3, an Abbe number of the fourth lens element is V4, an Abbe number of the fifth lens element is V5, a refractive index of the first lens element is N1, a refractive index of the second lens element is N2, a refractive index of the third lens element is N3, a refractive index of the fourth lens element is N4, a refractive index of the fifth lens element is N5, an Abbe number of one of the five lens elements is Vi, a refractive index of the one of the five lens elements is Ni, and a minimum value of Vi/Ni is (Vi/Ni)min, the following condition is satisfied: $7.5 < (Vi/Ni)min < 12.3$, wherein i=1, 2, 3, 4 or 5. Therefore, it is favorable for providing a proper lens material distribution of the image capturing lens system so as to reduce the system size and correct aberrations.

When half of a maximum field of view of the image capturing lens system at the short-focal-length end is HFOVS, the following condition is satisfied: $5.0$ degrees $< HFOVS < 25.0$ degrees. Therefore, it is favorable for adjusting the viewing angle at the short-focal-length end so as to obtain a telephoto configuration for various applications. Moreover, the following condition can also be satisfied: $7.5$ degrees $< HFOVS < 20.0$ degrees. Moreover, the following condition can also be satisfied: $10.0$ degrees $< HFOVS < 15.0$ degrees.

When a maximum distance between an optically effective area of the object-side surface of the first lens element and the optical axis when the image capturing lens system is at the long-focal-length end is Y11L, and a maximum distance between an optically effective area of the image-side surface of the fifth lens element and the optical axis when the image capturing lens system is at the long-focal-length end is Y52L, the following condition is satisfied: $0.50 < Y11L/Y52L < 2.0$. Therefore, it is favorable for adjusting light travelling direction so as to balance among the size, field of view, zoom ratio and image quality in the zooming process. Moreover, the following condition can also be satisfied: $0.55 < Y11L/Y52L < 1.8$. Please refer to FIG. 22, which shows a schematic view of Y11L and Y52L according to the 1st embodiment of the present disclosure. In addition, the image capturing lens system in FIG. 22 is at the long-focal-length end.

When a maximum distance between an optically effective area of the object-side surface of the first lens element and the optical axis when the image capturing lens system is at the short-focal-length end is Y11S, and a maximum distance between an optically effective area of the image-side surface of the fifth lens element and the optical axis when the image capturing lens system is at the short-focal-length end is Y52S, the following condition is satisfied: $0.50 < Y11S/Y52S < 2.0$. Therefore, it is favorable for adjusting light travelling direction so as to balance among the size, field of view, zoom ratio and image quality in the zooming process. Moreover, the following condition can also be satisfied: $0.55 < Y11S/Y52S < 1.8$. Please refer to FIG. 21, which shows a schematic view of Y11S and Y52S according to the 1st embodiment of the present disclosure. In addition, the image capturing lens system in FIG. 21 is at the short-focal-length end.

When an axial distance between the object-side surface of the first lens element and an image surface when the image capturing lens system is at the long-focal-length end is TLL, and an axial distance between the object-side surface of the first lens element and the image surface when the image capturing lens system is at the short-focal-length end is TLS, the following condition can be satisfied: $|TLL/TLS-1| < 1.0E-2$. Therefore, it is favorable for adjusting the lens elements and the image surface distribution during the zooming process so as to simplify the structure of the image capturing lens system. Moreover, the following condition can also be satisfied: $|TLL/TLS-1| < 5.0E-3$. Moreover, the following condition can also be satisfied: $|TLL/TLS-1| < 3.0E-3$. Moreover, the following condition can also be satisfied: $|TLL/TLS-1| < 1.0E-3$. Please refer to FIG. 21 and FIG. 22, which respectively show schematic views of TLS and TLL according to the 1st embodiment of the present disclosure.

When a focal length of the image capturing lens system at the long-focal-length end is fL, and a focal length of the image capturing lens system at the short-focal-length end is fS, the following condition can be satisfied: $1.45 < fL/fS$. Therefore, it is favorable for increasing the zoom ratio for more applications. Moreover, the following condition can also be satisfied: $1.95 < fL/fS$. Moreover, the following condition can also be satisfied: $2.45 < fL/fS$. Moreover, the following condition can also be satisfied: $fL/fS < 4.45$. Therefore, it is favorable for preventing the zoom ratio from being overly large so as to ensure compact system size and high image quality. Moreover, the following condition can also be satisfied: $fL/fS < 3.50$. Moreover, the following condition can also be satisfied: $fL/fS < 3.10$. Moreover, the following condition can also be satisfied: $1.45 < fL/fS < 3.10$.

When the Abbe number of the third lens element is V3, and the Abbe number of the fourth lens element is V4, the following condition can be satisfied: $1.5 < V3/V4 < 5.0$. Therefore, it is favorable for the materials of the third and fourth lens elements to collaborate with each other for correcting aberrations such as chromatic aberration. Moreover, the following condition can also be satisfied: $2.0 < V3/V4 < 4.5$. Moreover, the following condition can also be satisfied: $2.5 < V3/V4 < 4.0$.

When a curvature radius of the object-side surface of the fifth lens element is R9, and a curvature radius of the image-side surface of the fifth lens element is R10, the following condition can be satisfied: $0.10 < (R9+R10)/(R9-R10) < 5.0$. Therefore, it is favorable for adjusting the surface shape of the fifth lens element so as to adjust the incident angle of light on the image surface and thus improve the response efficiency of the image sensor.

When a focal length of the first lens element is f1, and a focal length of the second lens element is f2, the following condition can be satisfied: $|f2/f1| < 1.5$. Therefore, it is favorable for the refractive power of the first and second lens elements to collaborate with each other so as to increase the zoom ratio. Moreover, the following condition can also be satisfied: $|f2/f1| < 1.0$. Moreover, the following condition can also be satisfied: $|f2/f1| < 0.50$.

When the focal length of the second lens element is f2, and a focal length of the third lens element is f3, the following condition can be satisfied: $-2.0 < f2/f3 < -0.60$. Therefore, it is favorable for balancing the refractive power distribution of the image capturing lens system so as to correct aberrations. Moreover, the following condition can also be satisfied: $-1.7 < f2/f3 < -0.75$.

When the maximum distance between the optically effective area of the object-side surface of the first lens element and the optical axis when the image capturing lens system is at the long-focal-length end is Y11L, and a maximum image height of the image capturing lens system at the long-focal-length end (which can be half of a diagonal length of an effective photosensitive area of an image sensor) is ImgHL, the following condition can be satisfied: $0.50 < Y11L/ImgHL < 2.7$. Therefore, it is favorable for adjusting light travelling direction in the zooming process so as to reduce the outer diameter of the image capturing lens system, enlarge the image surface, and obtain a telephoto configuration. Moreover, the following condition can also be satisfied: $0.80 < Y11L/ImgHL < 2.2$. Please refer to FIG. 22, which shows a schematic view of Y11L and ImgHL according to the 1st embodiment of the present disclosure.

When the maximum distance between the optically effective area of the object-side surface of the first lens element and the optical axis when the image capturing lens system is at the short-focal-length end is Y11S, and a maximum image height of the image capturing lens system at the short-focal-length end (which can be half of the diagonal length of the effective photosensitive area of the image sensor) is ImgHS, the following condition can be satisfied: $0.50 < Y11S/ImgHS < 2.7$. Therefore, it is favorable for adjusting light travelling direction in the zooming process so as to reduce the outer diameter of the image capturing lens system, enlarge the image surface, and obtain a telephoto configuration. Moreover, the following condition can also be satisfied: $0.80 < Y11S/ImgHS < 2.2$. Please refer to FIG. 21, which shows a schematic view of Y11S and ImgHS according to the 1st embodiment of the present disclosure.

When an axial distance between a most object-side surface and a most image-side surface of the first lens group is TG1, and an axial distance between a most object-side surface and a most image-side surface of the third lens group is TG3, the following condition can be satisfied: $0.50 < TG1/TG3 < 2.0$. Therefore, it is favorable for balancing the lens elements distribution at the object side and image side of the image capturing lens system so as to reduce the system size and correct aberrations. Moreover, the following condition can also be satisfied: $0.65 < TG1/TG3 < 1.7$. Please refer to FIG. 22, which shows a schematic view of TG1 and TG3 according to the 1st embodiment of the present disclosure, wherein the most object-side surface of the first lens group G1 is the object-side surface 111 of the first lens element 110, the most image-side surface of the first lens group G1 is the image-side surface 122 of the second lens element 120, the most object-side surface of the third lens group G3 is the object-side surface 141 of the fourth lens element 140, and the most image-side surface of the third lens group G3 is the image-side surface 152 of the fifth lens element 150.

When a focal length of the second lens group is fG2, and a focal length of the third lens group is fG3, the following condition can be satisfied: $|fG2/fG3| < 0.60$. Therefore, it is favorable for the refractive power of the second and third lens groups to collaborate with each other so as to provide more consistent image quality in the zooming process. Moreover, the following condition can also be satisfied: $|fG2/fG3| < 0.45$. Moreover, the following condition can also be satisfied: |fG2/fG3|<0.30. Said focal length of one lens group is a composite focal length of all lens elements in the lens group.

When a focal length of the first lens group is fG1, and the focal length of the second lens group is fG2, the following condition can be satisfied: −7.0<fG1/fG2<−0.80. Therefore, it is favorable for adjusting the refractive power distribution of the lens groups so as to increase the zoom ratio. Moreover, the following condition can also be satisfied: −5.5<fG1/fG2<−1.0. Moreover, the following condition can also be satisfied: −4.0<fG1/fG2<−1.2.

When the axial distance between the object-side surface of the first lens element and the image surface when the image capturing lens system is at the long-focal-length end is TLL, and the maximum image height of the image capturing lens system at the long-focal-length end is ImgHL, the following condition can be satisfied: 8.0<TLL/ImgHL<15. Therefore, it is favorable for balancing between the system size and image surface size. Please refer to FIG. 22, which shows a schematic view of TLL and ImgHL according to the 1st embodiment of the present disclosure.

When the axial distance between the object-side surface of the first lens element and the image surface when the image capturing lens system is at the short-focal-length end is TLS, and the maximum image height of the image capturing lens system at the short-focal-length end is ImgHS, the following condition can be satisfied: 8.0<TLS/ImgHS<15. Therefore, it is favorable for balancing between the system size and image surface size. Please refer to FIG. 21, which shows a schematic view of TLS and ImgHS according to the 1st embodiment of the present disclosure.

When an axial distance between the first lens group and the second lens group when the image capturing lens system is at the long-focal-length end is TG12L, an axial distance between the first lens group and the second lens group when the image capturing lens system is at the short-focal-length end is TG12S, and an axial distance between a most object-side surface and a most image-side surface of the second lens group is TG2, the following condition can be satisfied: −6.0<(TG12L−TG12S)/TG2<−1.2. Therefore, it is favorable for the first lens group and the second lens group to collaborate each other during zooming process so as to increase the zoom ratio. Moreover, the following condition can also be satisfied: −4.0<(TG12L−TG12S)/TG2<−1.4. Please refer to FIG. 21 and FIG. 22, which show schematic views of TG12S, TG12L and TG2 according to the 1st embodiment of the present disclosure, wherein the most object-side surface of the second lens group G2 is the object-side surface 131 of the third lens element 130, and the most image-side of the second lens group G2 is the image-side surface 132 of the third lens element 130.

When half of a maximum field of view of the image capturing lens system at the long-focal-length end is HFOVL, the following condition can be satisfied: 3.0 degrees<HFOVL<10.0 degrees. Therefore, it is favorable for adjusting the field of view of the image capturing lens system at the long-focal-length end so as to obtain a telephoto configuration for various applications.

When the axial distance between the most object-side surface and the most image-side surface of the second lens group is TG2, and the axial distance between the most object-side surface and the most image-side surface of the third lens group is TG3, the following condition can be satisfied: 0.40<TG2/TG3<2.0. Therefore, it is favorable for adjusting the lens elements distribution so as to provide more consistent image quality in the zooming process. Moreover, the following condition can also be satisfied: 0.50<TG2/TG3<1.6.

When the focal length of the third lens group is fG3, an axial distance between the image-side surface of the fifth lens element and the image surface when the image capturing lens system is at the long-focal-length end is BLL, and an axial distance between the image-side surface of the fifth lens element and the image surface when the image capturing lens system is at the short-focal-length end is BLS, the following condition can be satisfied: fG3/(BLL−BLS)<−1.5. Therefore, it is favorable for correcting aberrations generated during the zooming process. Moreover, the following condition can also be satisfied: fG3/(BLL−BLS)<−2.5. Please refer to FIG. 21 and FIG. 22, which respectively show schematic views of BLS and BLL according to the 1st embodiment of the present disclosure.

When a curvature radius of the object-side surface of the third lens element is R5, and a curvature radius of the image-side surface of the third lens element is R6, the following condition can be satisfied: −1.0<(R5+R6)/(R5−R6)<0. Therefore, it is favorable for adjusting the surface shape and refractive power of the third lens element so as to reduce the outer diameter of the image capturing lens system.

When the focal length of the image capturing lens system at the short-focal-length end is fS, the focal length of the first lens group is fG1, the focal length of the second lens group is fG2, and the focal length of the third lens group is fG3, at least one of the following conditions can be satisfied: −1.8<fS/fG1<−0.45; 0.70<fS/fG2<2.4; or −0.70<fS/fG3<0.70. Therefore, it is favorable for adjusting the refractive power distribution when the image capturing lens system is at the short-focal-length end so as to balance among the system size, viewing angle and image quality. Moreover, at least one of the following conditions can also be satisfied: −1.2<fS/fG1<−0.50; or 1.0<fS/fG2<2.1.

When the axial distance between the object-side surface of the first lens element and the image surface when the image capturing lens system is at the long-focal-length end is TLL, and the focal length of the image capturing lens system at the long-focal-length end is fL, the following condition can be satisfied: 0.80<TLL/fL<1.8. Therefore, it is favorable for balancing between the total track length and field of view of the image capturing lens system at the long-focal-length end. Moreover, the following condition can also be satisfied: 1.0<TLL/fL<1.6.

When an f-number of the image capturing lens system at the short-focal-length end is FnoS, the following condition can be satisfied: 2.2<FnoS<3.8. Therefore, it is favorable for balancing between the depth of field and illuminance of the image capturing lens system at the short-focal-length end. Moreover, the following condition can also be satisfied: 2.4<FnoS<3.5.

According to the present disclosure, the aforementioned features and conditions can be utilized in numerous combinations so as to achieve corresponding effects.

According to the present disclosure, the lens elements of the image capturing lens system can be made of either glass or plastic material. When the lens elements are made of glass material, the refractive power distribution of the image capturing lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the image capturing lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the image capturing lens system, based on the corresponding image sensor, can be flat or curved, especially a curved surface being concave facing towards the object side of the image capturing lens system.

According to the present disclosure, an image correction unit, such as a field flattener, can be optionally disposed between the lens element closest to the image side of the image capturing lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 23:
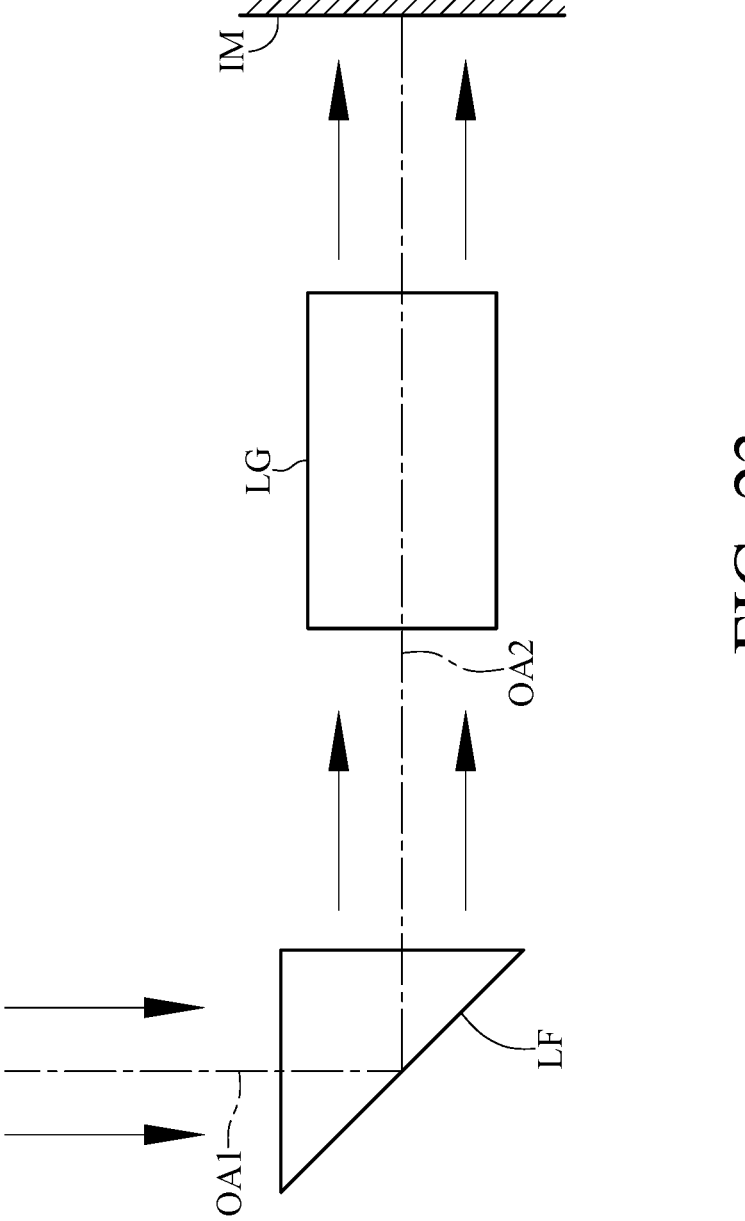
FIG. 23 shows a schematic view of a configuration of a light-folding element in an image capturing lens system according to one embodiment of the present disclosure.
Figure 24:
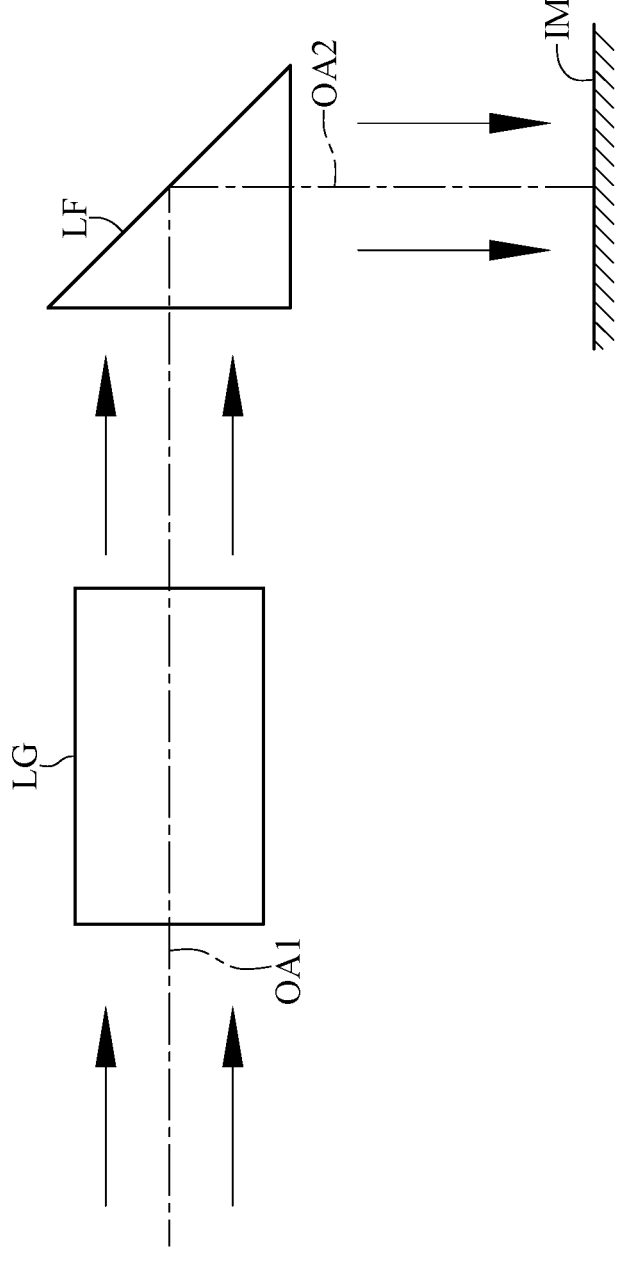
FIG. 24 shows a schematic view of another configuration of a light-folding element in an image capturing lens system according to one embodiment of the present disclosure.
Figure 25:
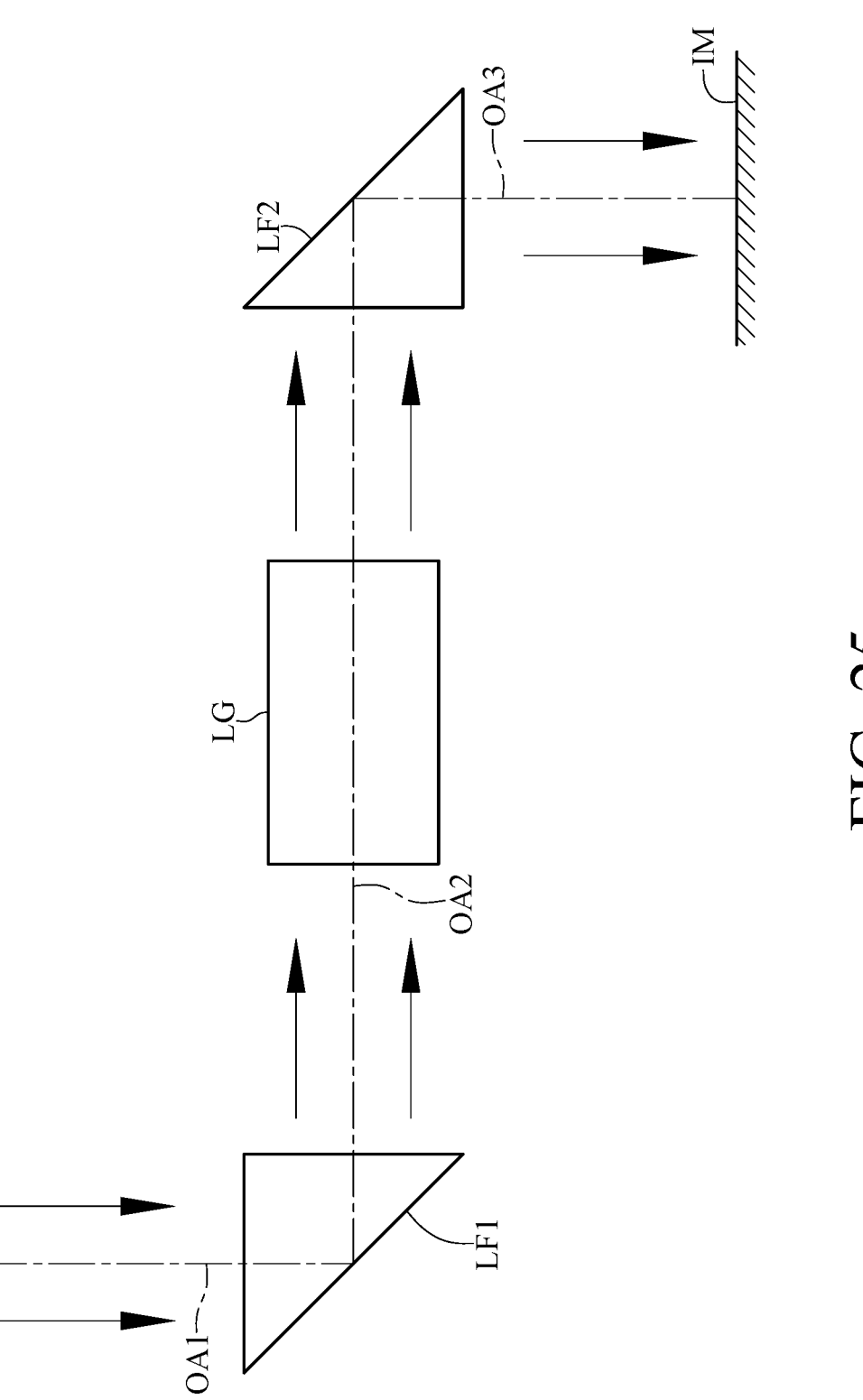
FIG. 25 shows a schematic view of a configuration of two light-folding elements in an image capturing lens system according to one embodiment of the present disclosure.

According to the present disclosure, at least one light-folding element can be optionally disposed between an imaged object and the image surface on the imaging optical path, such that the image capturing lens system can be more flexible in space arrangement, and therefore the dimensions of an electronic device is not restricted by the total track length of the image capturing lens system. Moreover, the at least one light-folding element can be disposed on the object side of the first lens element. Moreover, the at least one light-folding element can include at least one reflection mirror. Moreover, the at least one light-folding element can include at least one prism. Moreover, the prism can have refractive power, and the surface of the prism can include a non-planar surface, such as spherical surface, aspheric surface, concave surface or convex surface. Therefore, it is favorable for improving image quality. Specifically, please refer to FIG. 23 and FIG. 24. FIG. 23 shows a schematic view of a configuration of a light-folding element in an image capturing lens system according to one embodiment of the present disclosure, and FIG. 24 shows a schematic view of another configuration of a light-folding element in an image capturing lens system according to one embodiment of the present disclosure. In FIG. 23 and FIG. 24, the image capturing lens system can have, in order from an imaged object (not shown in figure) to an image surface IM along an optical path, a first optical axis OA1, a light-folding element LF and a second optical axis OA2. The light-folding element LF can be disposed between the imaged object and a lens group LG of the image capturing lens system as shown in FIG. 23 or disposed between a lens group LG of the image capturing lens system and the image surface IM as shown in FIG. 24. Furthermore, please refer to FIG. 25, which shows a schematic view of a configuration of two light-folding elements in an image capturing lens system according to one embodiment of the present disclosure. In FIG. 25, the image capturing lens system can have, in order from an imaged object (not shown in figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the image capturing lens system, and the second light-folding element LF2 is disposed between the lens group LG of the image capturing lens system and the image surface IM. The image capturing lens system can be optionally provided with three or more light-folding elements, and the present disclosure is not limited to the type, amount and position of the light-folding elements of the embodiments disclosed in the aforementioned figures.

According to the present disclosure, the image capturing lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the image capturing lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the image capturing lens system and thereby provides a wider field of view for the same.

According to the present disclosure, the image capturing lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 3:
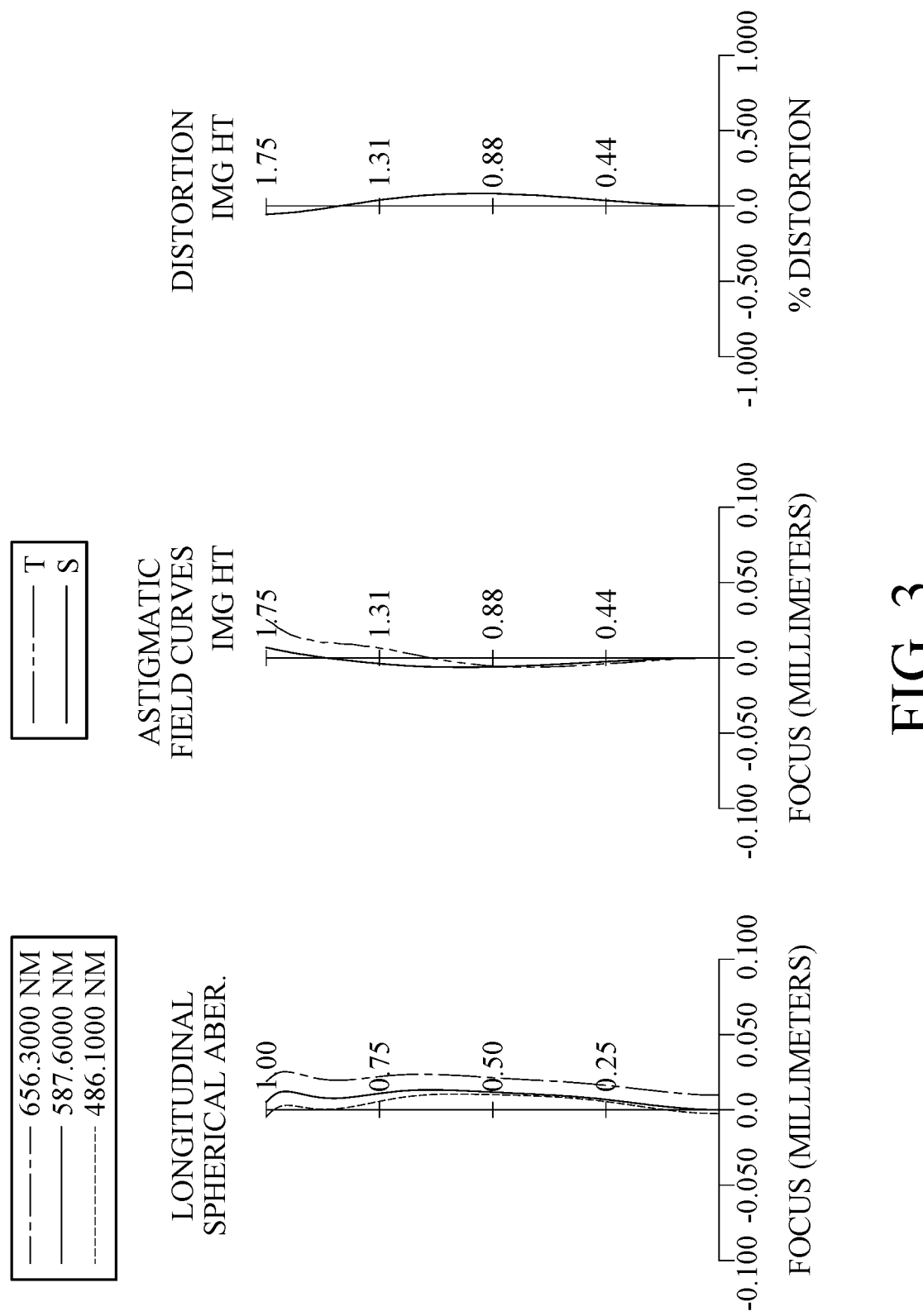
FIG. 3 shows spherical aberration curves, astigmatic field curves and a distortion curve of the image capturing unit at the short-focal-length end according to the 1st embodiment.
Figure 4:
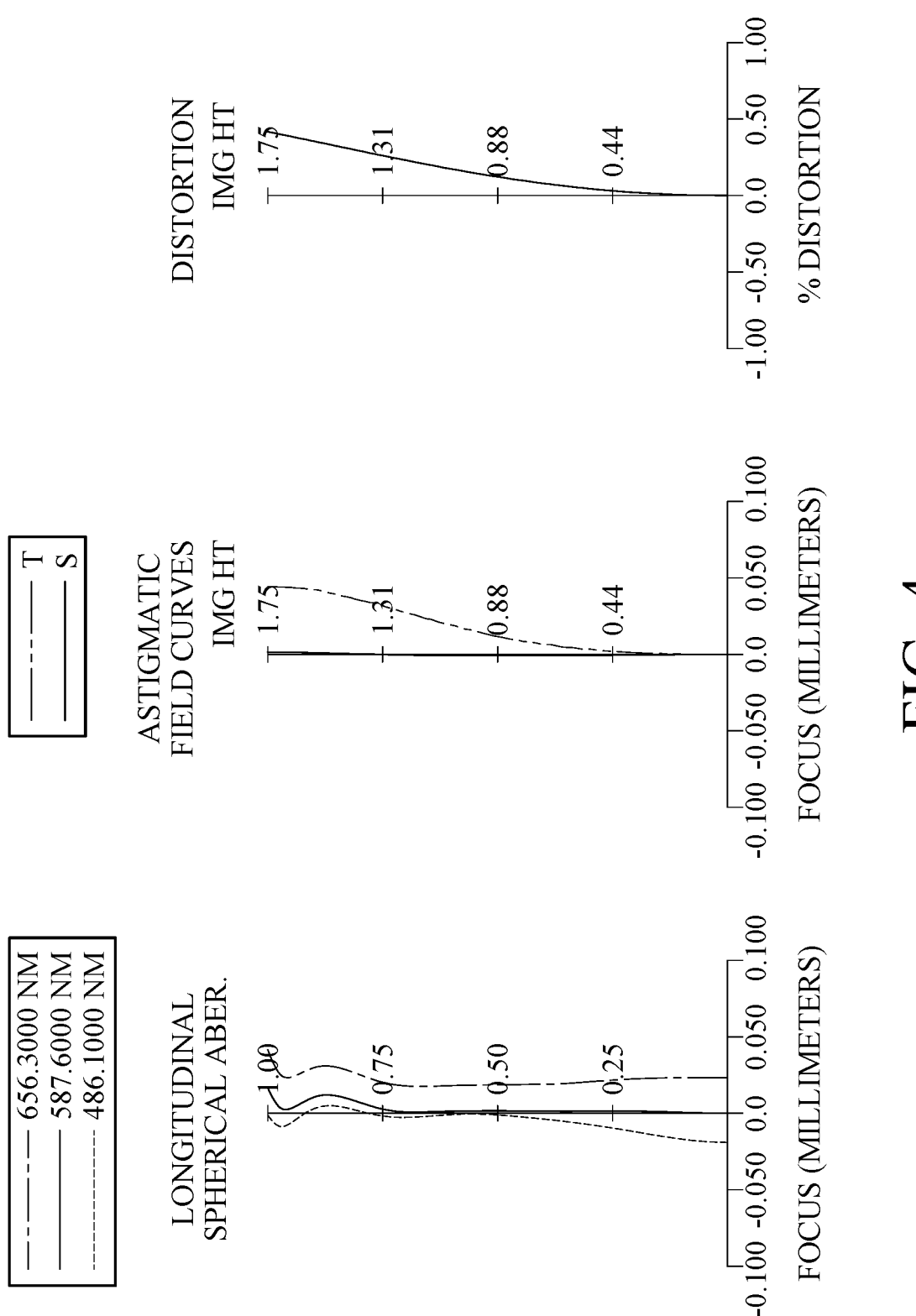
FIG. 4 shows spherical aberration curves, astigmatic field curves and a distortion curve of the image capturing unit at long-focal-length end according to the 1st embodiment.

FIG. 1 is a schematic view of an image capturing unit at the short-focal-length end according to the 1st embodiment of the present disclosure. FIG. 2 is a schematic view of the image capturing unit at the long-focal-length end according to the 1st embodiment of the present disclosure. FIG. 3 shows, in order from left to right, spherical aberration curves, astigmatic field curves and a distortion curve of the image capturing unit at the short-focal-length end according to the 1st embodiment. FIG. 4 shows, in order from left to right, spherical aberration curves, astigmatic field curves and a distortion curve of the image capturing unit at long-focal-length end according to the 1st embodiment. In FIG. 1 and FIG. 2, the image capturing unit includes the image capturing lens system (its reference numeral is omitted) of the present disclosure and an image sensor 180. The image capturing lens system includes, in order from an object side to an image side along an optical path, a stop 101, a first lens element 110, a second lens element 120, an aperture stop 100, a third lens element 130, a fourth lens element 140, a fifth lens element 150, a filter 160 and an image surface 170. In addition, the image capturing lens system has a configuration of a first lens group G1 including the first lens element 110 and the second lens element 120, a second lens group G2 including the aperture stop 100 and the third lens element 130, and a third lens group G3 including the fourth lens element 140 and the fifth lens element 150. The first lens group G1 has negative refractive power, the second lens group G2 has positive refractive power, and the third lens group G3 has negative refractive power. The image capturing lens system includes five lens elements (110, 120, 130, 140, and 150) with no additional lens element disposed between each of the adjacent five lens elements.

The focal length of the image capturing lens system is varied by changing axial distances between the three lens groups (G1, G2, and G3) in a zooming process. As shown in FIG. 1 and FIG. 2, the second lens group G2 is moved relative to the first lens group G1 along an optical axis in the zooming process, and the third lens group G3 is moved relative to the first lens group G1 along the optical axis in the zooming process. Furthermore, the image capturing lens system has a short-focal-length end as shown in FIG. 1 and a long-focal-length end as shown in FIG. 2. In addition, when the image capturing lens system is changing from the short-focal-length end to the long-focal-length end during the zooming process, the second lens group G2 is moved along the optical axis toward the object side relative to the first lens group G1. It is noted that there is no relative motion between lens elements of each of the three lens groups in the zooming process.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric. The first lens element 110 has at least one inflection point in an off-axis region thereof.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric. The third lens element 130 has at least one inflection point in an off-axis region thereof.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric. The fourth lens element 140 has at least one inflection point in an off-axis region thereof.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. The fifth lens element 150 has at least one inflection point and at least one critical point in an off-axis region thereof.

The filter 160 is made of glass material and located between the fifth lens element 150 and the image surface 170, and will not affect the focal length of the image capturing lens system. The image sensor 180 is disposed on or near the image surface 170.

The equation of the aspheric surface profiles of the aforementioned lens elements of the 1st embodiment is expressed as follows:

$$X(Y) = (Y^2/R)/\left(1 + sqrt\left(1 - (1+k) \times (Y/R)^2\right)\right) + \sum_i (Ai) \times (Y^i),$$

where,

X is a displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and $A_i$ is the i-th aspheric coefficient, and in the embodiments, i may be, but is not limited to, 4, 6, 8, 10, 12, 14 and 16.

In the image capturing lens system of the image capturing unit according to the 1st embodiment, a focal length of the image capturing lens system is f, an f-number of the image capturing lens system is Fno, half of a maximum field of view of the image capturing lens system is HFOV, an axial distance between an imaged object and the stop 101 is D0, an axial distance between the second lens element 120 and the aperture stop 100 is D5, an axial distance between the third lens element 130 and the fourth lens element 140 is D8, and an axial distance between the filter 160 and the image surface 170 is D14. With different focusing conditions, the aforementioned parameters may have different values. In this embodiment, two of various focusing states of the image capturing lens system according to different focusing conditions are provided (i.e., different object distances). A first focusing state of the image capturing lens system is a state where the image capturing lens system focuses on an imaged object located at infinity, and a second focusing state of the image capturing lens system is a state where the image capturing lens system focuses on an imaged object located at a finite distance.

Furthermore, in each focusing state, some of the aforementioned parameters have different values when the image capturing lens system is at the short-focal-length end or at the long-focal-length end. Specifically, a focal length of the image capturing lens system at the short-focal-length end is fS, a focal length of the image capturing lens system at the long-focal-length end is fL, an f-number of the image capturing lens system at the short-focal-length end is FnoS, an f-number of the image capturing lens system at the long-focal-length end is FnoL, half of a maximum field of view of the image capturing lens system at the short-focal-length end is HFOVS, and half of a maximum field of view of the image capturing lens system at the long-focal-length end is HFOVL.

Note that FIG. 1 shows the image capturing lens system at the short-focal-length end in the first focusing state, and FIG. 2 shows the image capturing lens system at the long-focal-length end in the first focusing state.

In the first focusing state, when the image capturing lens system is at the short-focal-length end, the aforementioned parameters have the following values: fS=7.50 millimeters (mm), FnoS=2.92, HFOVS=13.1 degrees (deg.), D0=∞ (infinity), D5=5.787 mm, D8=0.400 mm, and D14=4.786 mm.

In the first focusing state, when the image capturing lens system is at the long-focal-length end, the aforementioned parameters have the following values: fL=18.75 mm, FnoL=4.45, HFOVL=5.3 degrees, D0=∞, D5=0.594 mm, D8=0.886 mm, and D14=9.500 mm.

When a focal length of the first lens group G1 is fG1, a focal length of the second lens group G2 is fG2, and a focal length of the third lens group G3 is fG3, the following conditions are satisfied: fG1=−10.69 mm; fG2=3.94 mm; and fG3=−17.03 mm.

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the i-th lens element is Vi, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the i-th lens element is Ni, and a minimum value of Vi/Ni is (Vi/Ni)min, the following condition is satisfied: (Vi/Ni)min=10.90, wherein i=1, 2, 3, 4, or 5. In this embodiment, among the first through fifth lens elements (110-150), a ratio of the Abbe number and the refractive index of the fourth lens element 140 is equal to a ratio of the Abbe number and the refractive index of the fifth lens element 150 and smaller than that of the other lens elements, and (Vi/Ni)min is equal to the ratio of the Abbe number and the refractive index of the fourth lens element 140 and the ratio of the Abbe number and the refractive index of the fifth lens element 150.

When the Abbe number of the third lens element 130 is V3, and the Abbe number of the fourth lens element 140 is V4, the following condition is satisfied: V3/V4=3.05.

When an axial distance between the first lens group G1 and the second lens group G2 when the image capturing lens system is at the long-focal-length end is TG12L, an axial distance between the first lens group G1 and the second lens group G2 when the image capturing lens system is at the short-focal-length end is TG12S, and an axial distance between a most object-side surface and a most image-side surface of the second lens group G2 is TG2, the following condition is satisfied: (TG12L−TG12S)/TG2=−2.08.

When an axial distance between the object-side surface 111 of the first lens element 110 and the image surface 170 when the image capturing lens system is at the long-focal-length end is TLL, and an axial distance between the object-side surface 111 of the first lens element 110 and the image surface 170 when the image capturing lens system is at the short-focal-length end is TLS, the following condition is satisfied: |TLL/TLS−1|=3.54E-04.

When an axial distance between a most object-side surface and a most image-side surface of the first lens group G1 is TG1, and an axial distance between a most object-side surface and a most image-side surface of the third lens group G3 is TG3, the following condition is satisfied: TG1/TG3=1.39.

When the axial distance between the most object-side surface and the most image-side surface of the second lens group G2 is TG2, and the axial distance between the most object-side surface and the most image-side surface of the third lens group G3 is TG3, the following condition is satisfied: TG2/TG3=0.90.

When the axial distance between the object-side surface 111 of the first lens element 110 and the image surface 170 when the image capturing lens system is at the long-focal-length end is TLL, and the focal length of the image capturing lens system at the long-focal-length end is fL, the following condition is satisfied: TLL/fL=1.12.

When the axial distance between the object-side surface 111 of the first lens element 110 and the image surface 170 when the image capturing lens system is at the long-focal-length end is TLL, and a maximum image height of the image capturing lens system at the long-focal-length end is ImgHL, the following condition is satisfied: TLL/ImgHL=11.99.

When the axial distance between the object-side surface 111 of the first lens element 110 and the image surface 170 when the image capturing lens system is at the short-focal-length end is TLS, and a maximum image height of the image capturing lens system at the short-focal-length end is ImgHS, the following condition is satisfied: TLS/ImgHS=11.99.

When a curvature radius of the object-side surface 131 of the third lens element 130 is R5, and a curvature radius of the image-side surface 132 of the third lens element 130 is R6, the following condition is satisfied: (R5+R6)/(R5−R6) =−0.16.

When a curvature radius of the object-side surface 151 of the fifth lens element 150 is R9, and a curvature radius of the image-side surface 152 of the fifth lens element 150 is R10, the following condition is satisfied: (R9+R10)/(R9−R10) =0.23.

When a focal length of the first lens element 110 is f1, and a focal length of the second lens element 120 is f2, the following condition is satisfied: |f2/f1|=0.37. When the focal length of the second lens group G2 is fG2, and the focal length of the third lens group G3 is fG3, the following condition is satisfied: |fG2/fG3|=0.23.

When the focal length of the second lens element 120 is f2, and a focal length of the third lens element 130 is f3, the following condition is satisfied: f2/f3=−0.89.

When the focal length of the first lens group G1 is fG1, and the focal length of the second lens group G2 is fG2, the following condition is satisfied: fG1/fG2=−2.71.

When the focal length of the third lens group G3 is fG3, an axial distance between the image-side surface 152 of the fifth lens element 150 and the image surface 170 when the image capturing lens system is at the long-focal-length end is BLL, and an axial distance between the image-side surface 152 of the fifth lens element 150 and the image surface 170 when the image capturing lens system is at the short-focal-length end is BLS, the following condition is satisfied: fG3/(BLL−BLS)=−3.61.

When the focal length of the image capturing lens system at the long-focal-length end is fL, and the focal length of the image capturing lens system at the short-focal-length end is fS, the following condition is satisfied: fL/fS=2.50.

When the focal length of the image capturing lens system at the short-focal-length end is fS, the focal length of the first lens group G1 is fG1, the focal length of the second lens group G2 is fG2, and the focal length of the third lens group G3 is fG3, the following conditions are satisfied: fS/fG1=−0.70; fS/fG2=1.90; and fS/fG3=−0.44.

When a maximum distance between an optically effective area of the object-side surface 111 of the first lens element 110 and the optical axis when the image capturing lens system is at the long-focal-length end is Y11L, and the maximum image height of the image capturing lens system at the long-focal-length end is ImgHL, the following condition is satisfied: Y11L/ImgHL=1.50.

When the maximum distance between the optically effective area of the object-side surface 111 of the first lens element 110 and the optical axis when the image capturing lens system is at the long-focal-length end is Y11L, and a maximum distance between an optically effective area of the image-side surface 152 of the fifth lens element 150 and the optical axis when the image capturing lens system is at the long-focal-length end is Y52L, the following condition is satisfied: Y11L/Y52L=1.46.

When a maximum distance between an optically effective area of the object-side surface 111 of the first lens element 110 and the optical axis when the image capturing lens system is at the short-focal-length end is Y11S, and the maximum image height of the image capturing lens system at the short-focal-length end is ImgHS, the following condition is satisfied: Y11S/ImgHS=1.71.

When the maximum distance between the optically effective area of the object-side surface 111 of the first lens element 110 and the optical axis when the image capturing lens system is at the short-focal-length end is Y11S, and a maximum distance between an optically effective area of the image-side surface 152 of the fifth lens element 150 and the optical axis when the image capturing lens system is at the short-focal-length end is Y52S, the following condition is satisfied: Y11S/Y52S=1.64.

The detailed optical data of the 1st embodiment are shown in Table 1 and Table 2, and the aspheric surface data are shown in Table 3 below.

TABLE 1

| 1st Embodiment | | | | | | | |
|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −0.515 | | | | |
| 2 | Lens 1 | 12.730 | (ASP) | 1.232 | Plastic | 1.545 | 56.1 | 9.43 |
| 3 | | −8.322 | (ASP) | 2.290 | | | | |
| 4 | Lens 2 | −46.085 | (ASP) | 0.372 | Plastic | 1.544 | 56.0 | −3.50 |
| 5 | | 1.992 | (ASP) | D5 | | | | |
| 6 | Ape. Stop | Plano | | −0.394 | | | | |
| 7 | Lens 3 | 3.272 | (ASP) | 2.502 | Plastic | 1.544 | 56.0 | 3.94 |
| 8 | | −4.542 | (ASP) | D8 | | | | |
| 9 | Lens 4 | −4.198 | (ASP) | 0.542 | Plastic | 1.686 | 18.4 | −5.42 |
| 10 | | 34.259 | (ASP) | 1.397 | | | | |
| 11 | Lens 5 | 19.082 | (ASP) | 0.854 | Plastic | 1.686 | 18.4 | 10.88 |
| 12 | | −12.033 | (ASP) | 1.000 | | | | |
| 13 | Filter | Plano | | 0.210 | Glass | 1.517 | 64.2 | — |
| 14 | | Plano | | D14 | | | | |
| 15 | Image | Plano | | — | | | | |

Note:
Reference wavelength is 587.6 nm (d-line).
An effective radius of the stop 101 (Surface 1) is 3.000 mm.

In Table 1, the curvature radius, the thickness and the focal length are shown in millimeters (mm). Surface numbers 0-15 represent the surfaces sequentially arranged from the object side to the image side along the optical axis.

The rest optical data of the image capturing lens system, including in the second focusing state, are disclosed in Table 2 below. Also, the definitions of the parameters shown in Table 2 are consistent with those stated in the first focusing state. Furthermore, in each focusing state, one of various zooming states between the short-focal-length end and the long-focal-length end of the image capturing lens system and corresponding optical data are also disclosed in this embodiment. In addition, it can be known from Table 2 that when the object distance decreases in the focusing process (e.g., from the first focusing state to the second focusing state), the axial distance between the first lens group G1 and the third lens group G3 increases from, for example, 8.295 mm (at the short-focal-length end) and 3.588 mm (at the long-focal-length end) of the first focusing state to 8.322 mm (at the short-focal-length end) and 3.704 mm (at the long-focal-length end) of the second focusing state; that is, when the object distance decreases in the focusing process, the third lens group G3 is moved along the optical axis toward the image side relative to the first lens group G1 in the focusing process.

curves, and the definitions of the tables are the same as Table 1 to Table 3 of the 1st embodiment. Therefore, an explanation in this regard will not be provided again.

2nd Embodiment

Figures 5, 6:
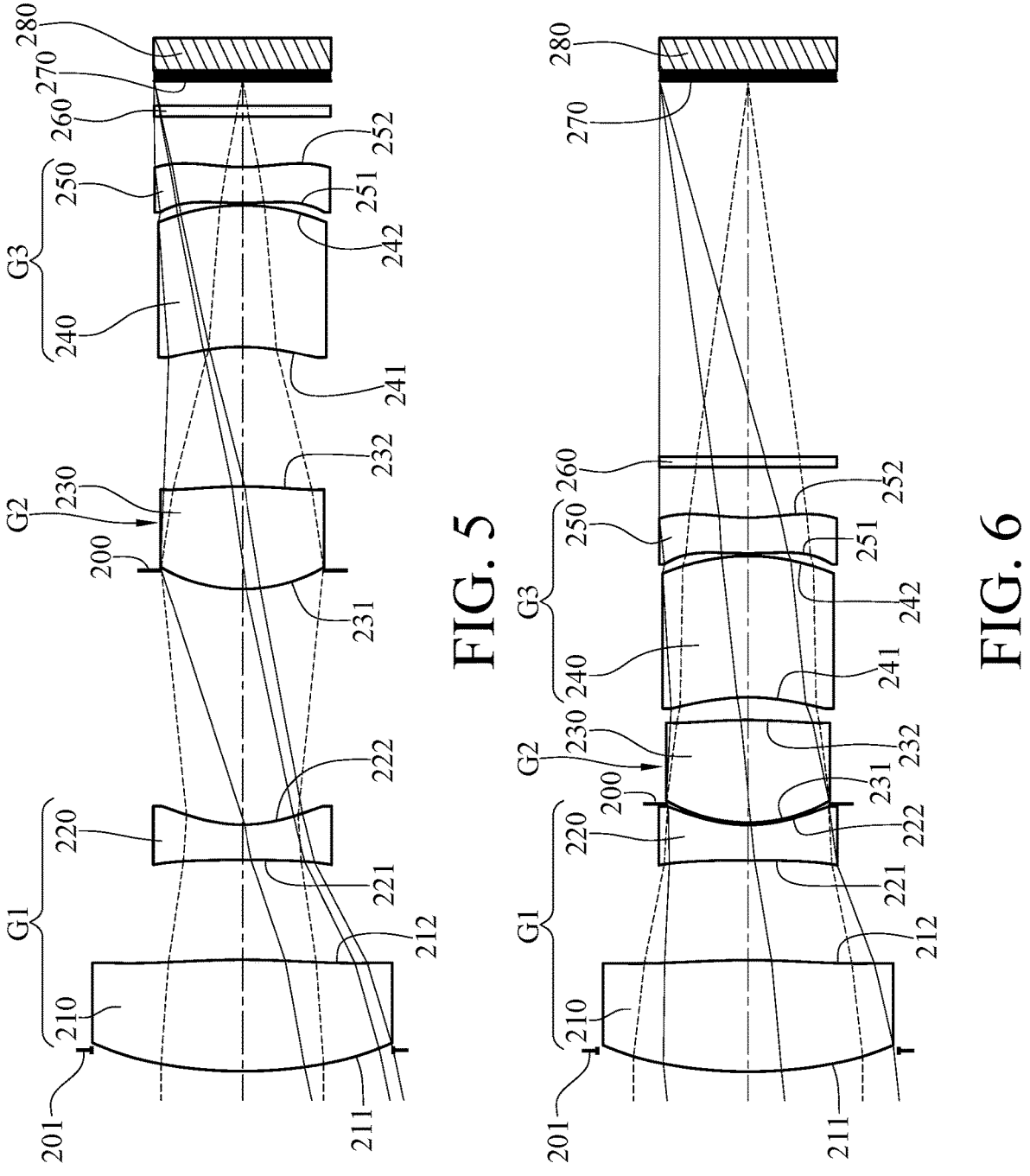
FIG. 5 is a schematic view of an image capturing unit at the short-focal-length end according to the 2nd embodiment of the present disclosure.
FIG. 6 is a schematic view of the image capturing unit at the long-focal-length end according to the 2nd embodiment of the present disclosure.
Figure 7:
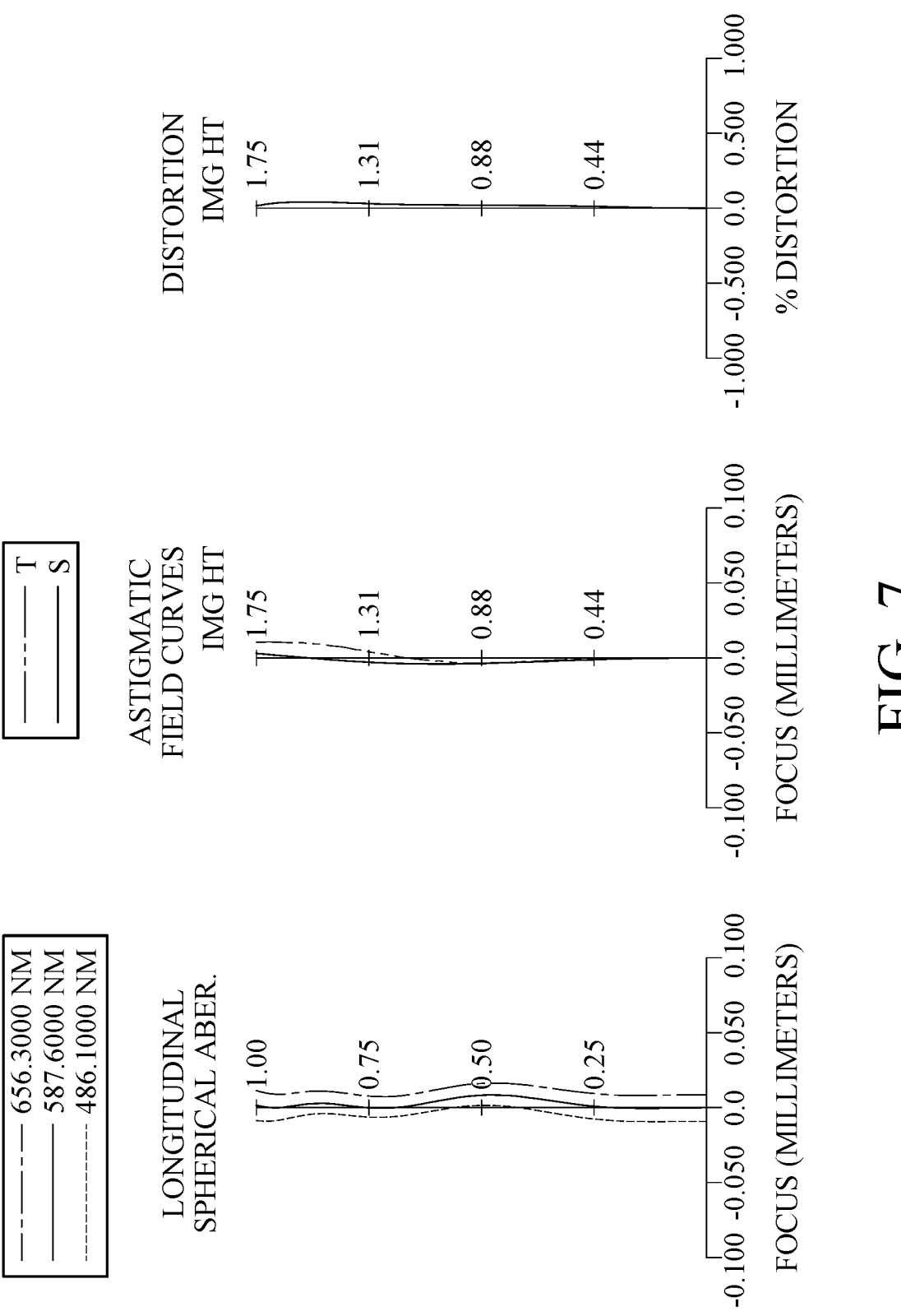
FIG. 7 shows spherical aberration curves, astigmatic field curves and a distortion curve of the image capturing unit at the short-focal-length end according to the 2nd embodiment.

FIG. 5 is a schematic view of an image capturing unit at the short-focal-length end according to the 2nd embodiment of the present disclosure. FIG. 6 is a schematic view of the image capturing unit at the long-focal-length end according to the 2nd embodiment of the present disclosure. FIG. 7 shows, in order from left to right, spherical aberration curves, astigmatic field curves and a distortion curve of the image capturing unit at the short-focal-length end according

TABLE 2

| 1st Embodiment | | | | | | | |
|---|---|---|---|---|---|---|---|
| First Focusing State | | | | | | | |
| | Short-focal-length End | | Long-focal-length End | | | | |
| f[mm] | 7.50 | 13.13 | 18.75 | fG1 [mm] | −10.69 | |f2/f1| | 0.37 |
| Fno | 2.92 | 3.78 | 4.45 | fG2 [mm] | 3.94 | |fG2/fG3| | 0.23 |
| HFOV [deg.] | 13.1 | 7.6 | 5.3 | fG3 [mm] | −17.03 | f2/f3 | −0.89 |
| D0 [mm] | ∞ | ∞ | ∞ | (Vi/Ni)min | 10.90 | fG1/fG2 | −2.71 |
| D5 [mm] | 5.787 | 2.322 | 0.594 | V3/V4 | 3.05 | fG3/(BLL − BLS) | −3.61 |
| D8 [mm] | 0.400 | 0.200 | 0.886 | (TG12L − TG12S)/TG2 | −2.08 | fL/fS | 2.50 |
| D14 [mm] | 4.786 | 8.446 | 9.500 | |TLL/TLS − 1| | 3.54E−04 | fS/fG1 | −0.70 |
| Second Focusing State | | | | TG1/TG3 | 1.39 | fS/fG2 | 1.90 |
| | Short-focal-length End | | Long-focal-length End | | TG2/TG3 | 0.90 | fS/fG3 | −0.44 |
| Fno | 2.93 | 3.80 | 4.49 | TLL/fL | 1.12 | Y11L/ImgHL | 1.50 |
| HFOV [deg.] | 13.1 | 7.5 | 5.3 | TLL/ImgHL | 11.99 | Y11L/Y52L | 1.46 |
| DO [mm] | 1000.000 | 1000.000 | 1000.000 | TLS/ImgHS | 11.99 | Y11S/ImgHS | 1.71 |
| D5 [mm] | 5.787 | 2.322 | 0.594 | (R5 + R6)/(R5 − R6) | −0.16 | Y11S/Y52S | 1.64 |
| D8 [mm] | 0.427 | 0.262 | 1.002 | (R9 + R10)/(R9 − R10) | 0.23 | — | — |
| D14 [mm] | 4.761 | 8.384 | 9.389 | — | — | — | — |

TABLE 3

| Aspheric Coefficients | | | | | |
|---|---|---|---|---|---|
| Surface # | 2 | 3 | 4 | 5 | 7 |
| k = | 0.0000E+00 | 0.0000E+00 | 0.0000E+00 | 0.0000E+00 | 0.0000E+00 |
| A4 = | 3.2047E−03 | 7.1078E−03 | −7.6190E−02 | −1.1372E−01 | −4.2790E−03 |
| A6 = | −1.9268E−04 | −8.6847E−04 | 4.5462E−02 | 5.6887E−02 | 1.3359E−03 |
| A8 = | 3.8338E−05 | 1.6573E−04 | −2.1017E−02 | −2.9369E−02 | −1.3549E−03 |
| A10 = | −2.6068E−06 | −2.2900E−05 | 6.5079E−03 | 9.7107E−03 | 7.8283E−04 |
| A12 = | −3.2172E−08 | 1.7386E−06 | −1.1826E−03 | −1.9181E−03 | −2.3273E−04 |
| A14 = | 1.1975E−08 | −5.0355E−08 | 9.4223E−05 | 1.5461E−04 | 2.8475E−05 |
| A16 = | — | — | — | — | −3.4129E−07 |

| Surface # | 8 | 9 | 10 | 11 | 12 |
|---|---|---|---|---|---|
| k = | 0.0000E+00 | 0.0000E+00 | 0.0000E+00 | 0.0000E+00 | 0.0000E+00 |
| A4 = | 7.0203E−03 | 6.3622E−02 | 7.0316E−02 | 1.6736E−02 | 7.1574E−03 |
| A6 = | 3.8251E−03 | −3.4629E−02 | −3.7496E−02 | −1.1716E−02 | −4.9477E−03 |
| A8 = | −6.4021E−03 | 1.4537E−02 | 1.7154E−02 | 5.8994E−03 | 1.0448E−03 |
| A10 = | 5.2091E−03 | −4.2245E−03 | −7.8850E−03 | −3.2712E−03 | −2.2425E−04 |
| A12 = | −2.3084E−03 | 7.7101E−04 | 3.1222E−03 | 1.1961E−03 | −3.4020E−06 |
| A14 = | 5.3734E−04 | −6.4609E−05 | −7.9131E−04 | −2.6000E−04 | 3.2643E−06 |
| A16 = | −5.1060E−05 | — | 8.7752E−05 | 2.3273E−05 | — |

Figure 8:
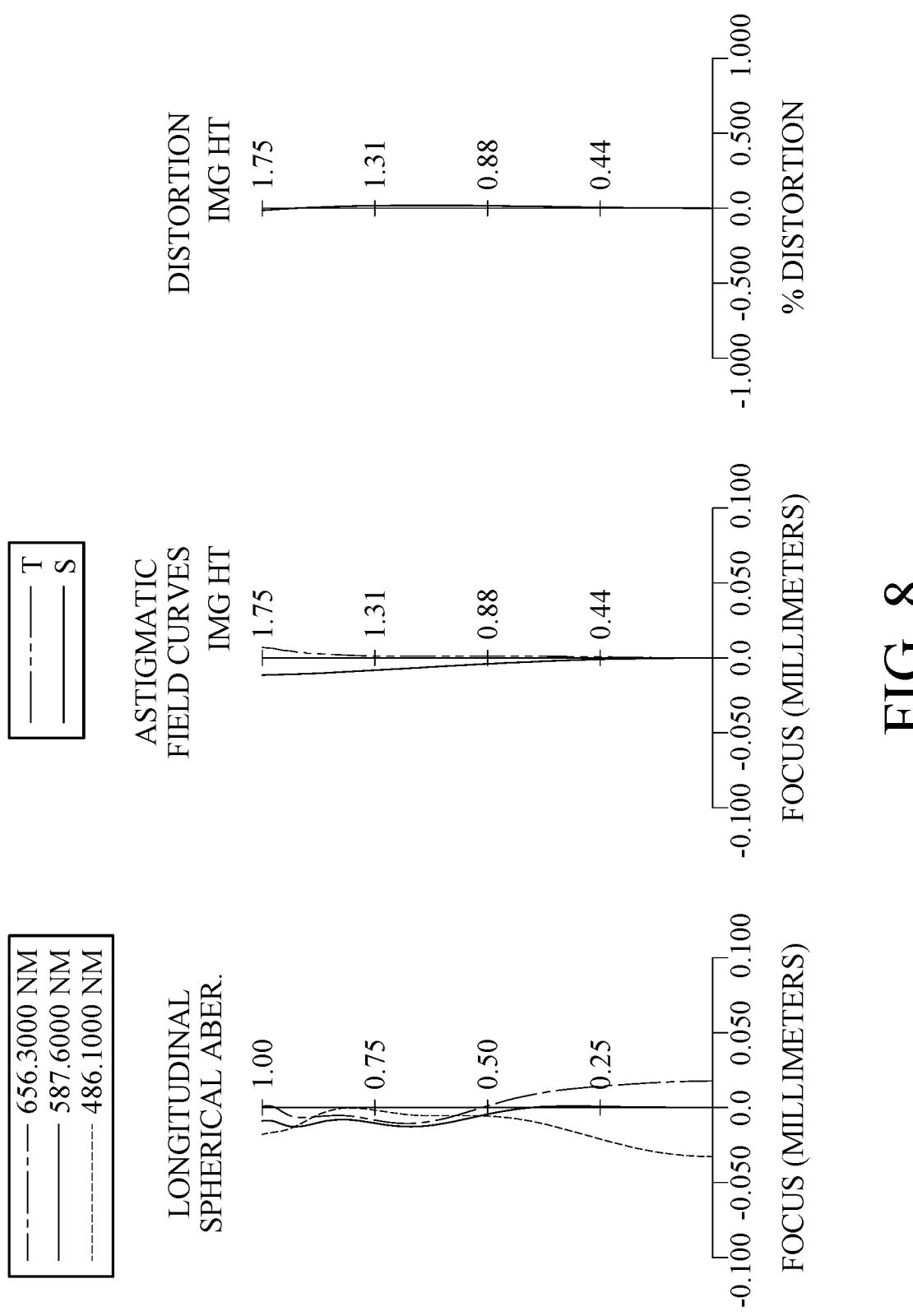
FIG. 8 shows spherical aberration curves, astigmatic field curves and a distortion curve of the image capturing unit at long-focal-length end according to the 2nd embodiment.

In Table 3, k represents the conic coefficient of the equation of the aspheric surface profiles. A4-A16 represent the aspheric coefficients ranging from the 4th order to the 16th order. The tables presented below for each embodiment are the corresponding schematic parameter and aberration to the 2nd embodiment. FIG. 8 shows, in order from left to right, spherical aberration curves, astigmatic field curves and a distortion curve of the image capturing unit at long-focal-length end according to the 2nd embodiment. In FIG. 5 and FIG. 6, the image capturing unit includes the image capturing lens system (its reference numeral is omitted) of the present disclosure and an image sensor 280. The image capturing lens system includes, in order from an object side to an image side along an optical path, a stop 201, a first lens element 210, a second lens element 220, an aperture stop 200, a third lens element 230, a fourth lens element 240, a fifth lens element 250, a filter 260 and an image surface 270. In addition, the image capturing lens system has a configuration of a first lens group G1 including the first lens element 210 and the second lens element 220, a second lens group G2 including the aperture stop 200 and the third lens element 230, and a third lens group G3 including the fourth lens element 240 and the fifth lens element 250. The first lens group G1 has negative refractive power, the second lens group G2 has positive refractive power, and the third lens group G3 has negative refractive power. The image capturing lens system includes five lens elements (210, 220, 230, 240, and 250) with no additional lens element disposed between each of the adjacent five lens elements.

The focal length of the image capturing lens system is varied by changing axial distances between the three lens groups (G1, G2, and G3) in a zooming process. As shown in FIG. 5 and FIG. 6, the second lens group G2 is moved relative to the first lens group G1 along an optical axis in the zooming process, and the third lens group G3 is moved relative to the first lens group G1 along the optical axis in the zooming process. Furthermore, the image capturing lens system has a short-focal-length end as shown in FIG. 5 and a long-focal-length end as shown in FIG. 6. In addition, when the image capturing lens system is zooming from the short-focal-length end to the long-focal-length end, the second lens group G2 is moved along the optical axis toward the object side relative to the first lens group G1. It is noted that there is no relative motion between lens elements of each of the three lens groups in the zooming process.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric. The first lens element 210 has at least one inflection point in an off-axis region thereof.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of glass material and has the object-side surface 231 and the image-side surface 232 being both aspheric. The third lens element 230 has at least one inflection point and at least one critical point in an off-axis region thereof.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. The fourth lens element 240 has at least one inflection point in an off-axis region thereof.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The fifth lens element 250 has at least one inflection point and at least one critical point in an off-axis region thereof.

The filter 260 is made of glass material and located between the fifth lens element 250 and the image surface 270, and will not affect the focal length of the image capturing lens system. The image sensor 280 is disposed on or near the image surface 270.

In this embodiment, one of various focusing states of the image capturing lens system is provided, and the focusing state of the image capturing lens system is a state where the image capturing lens system focuses on an imaged object located at infinity.

The detailed optical data of the 2nd embodiment are shown in Table 4 and Table 5, and the aspheric surface data are shown in Table 6 below.

TABLE 4

| Surface # | | Curvature Radius | | Thickness | Material | Index | Abbe # | Focal Length |
|---|---|---|---|---|---|---|---|---|
| | | | 2nd Embodiment | | | | | |
| 0 | Object | Plano | | Infinity | | | | |
| 1 | Stop | Plano | | −0.414 | | | | |
| 2 | Lens 1 | 9.844 | (ASP) | 2.200 | Plastic | 1.639 | 23.5 | 9.86 |
| 3 | | −15.940 | (ASP) | 1.970 | | | | |
| 4 | Lens 2 | −58.482 | (ASP) | 0.710 | Plastic | 1.650 | 21.8 | −4.08 |
| 5 | | 2.792 | (ASP) | D5 | | | | |
| 6 | Ape. Stop | Plano | | −0.370 | | | | |
| 7 | Lens 3 | 3.299 | (ASP) | 2.027 | Glass | 1.569 | 71.3 | 4.58 |
| 8 | | −9.634 | (ASP) | D8 | | | | |
| 9 | Lens 4 | −4.161 | (ASP) | 2.800 | Plastic | 1.701 | 14.8 | 22.03 |
| 10 | | −4.187 | (ASP) | 0.050 | | | | |
| 11 | Lens 5 | 8.370 | (ASP) | 0.706 | Plastic | 1.544 | 56.0 | −15.83 |
| 12 | | 4.119 | (ASP) | 1.000 | | | | |
| 13 | Filter | Plano | | 0.210 | Glass | 1.517 | 64.2 | — |

TABLE 4-continued

| Surface # | | Curvature Radius | Thickness | Material | Index | Abbe # | Focal Length |
|---|---|---|---|---|---|---|---|
| | | 2nd Embodiment | | | | | |
| 14 | | Plano | D14 | | | | |
| 15 | Image | Plano | — | | | | |

Note:
Reference wavelength is 587.6 nm (d-line).
An effective radius of the stop 201 (Surface 1) is 2.980 mm.

The definitions of these parameters shown in Table 5 are the same as those stated in the 1st embodiment with corresponding values for the 2nd embodiment, so an explanation in this regard will not be provided again.

Moreover, these parameters can be calculated from Table 4 and Table 6 as the following values and satisfy the following conditions:

TABLE 5

| | Short-focal-length End | Long-focal-length End | | | | | |
|---|---|---|---|---|---|---|---|
| | | 2nd Embodiment | | | | | |
| f[mm] | 8.30 | 16.71 | fG1 [mm] | −15.87 | \|f2/f1\| | 0.41 | |
| Fno | 2.58 | 3.67 | fG2 [mm] | 4.58 | \|fG2/fG3\| | 0.15 | |
| HFOV [deg.] | 11.9 | 6.0 | fG3 [mm] | −30.86 | f2/f3 | −0.89 | |
| D5 [mm] | 5.034 | 0.420 | (Vi/Ni)min | 8.70 | fG1/fG2 | −3.47 | |
| D8 [mm] | 2.767 | 0.450 | V3/V4 | 4.82 | fG3/(BLL − BLS) | −4.45 | |
| D14 [mm] | 0.503 | 7.442 | (TG12L − TG12S)/TG2 | −2.28 | fL/fS | 2.01 | |
| | | | \|TLL/TLS − 1\| | 4.28E−04 | fS/fG1 | −0.52 | |
| | | | TG1/TG3 | 1.37 | fS/fG2 | 1.81 | |
| | | | TG2/TG3 | 0.57 | fS/fG3 | −0.27 | |
| | | | TLL/fL | 1.17 | Y11L/ImgHL | 1.64 | |
| | | | TLL/ImgHL | 11.21 | Y11L/Y52L | 1.63 | |
| | | | TLS/ImgHS | 11.20 | Y11S/ImgHS | 1.69 | |
| | | | (R5 + R6)/(R5 − R6) | −0.49 | Y11S/Y52S | 1.71 | |
| | | | (R9 + R10)/(R9 − R10) | 2.94 | — | — | |

In the 2nd embodiment, the equation of the aspheric surface profiles of the aforementioned lens elements is the same as the equation of the 1st embodiment, so an explanation in this regard will not be provided again.

3rd Embodiment

Figures 9, 10:
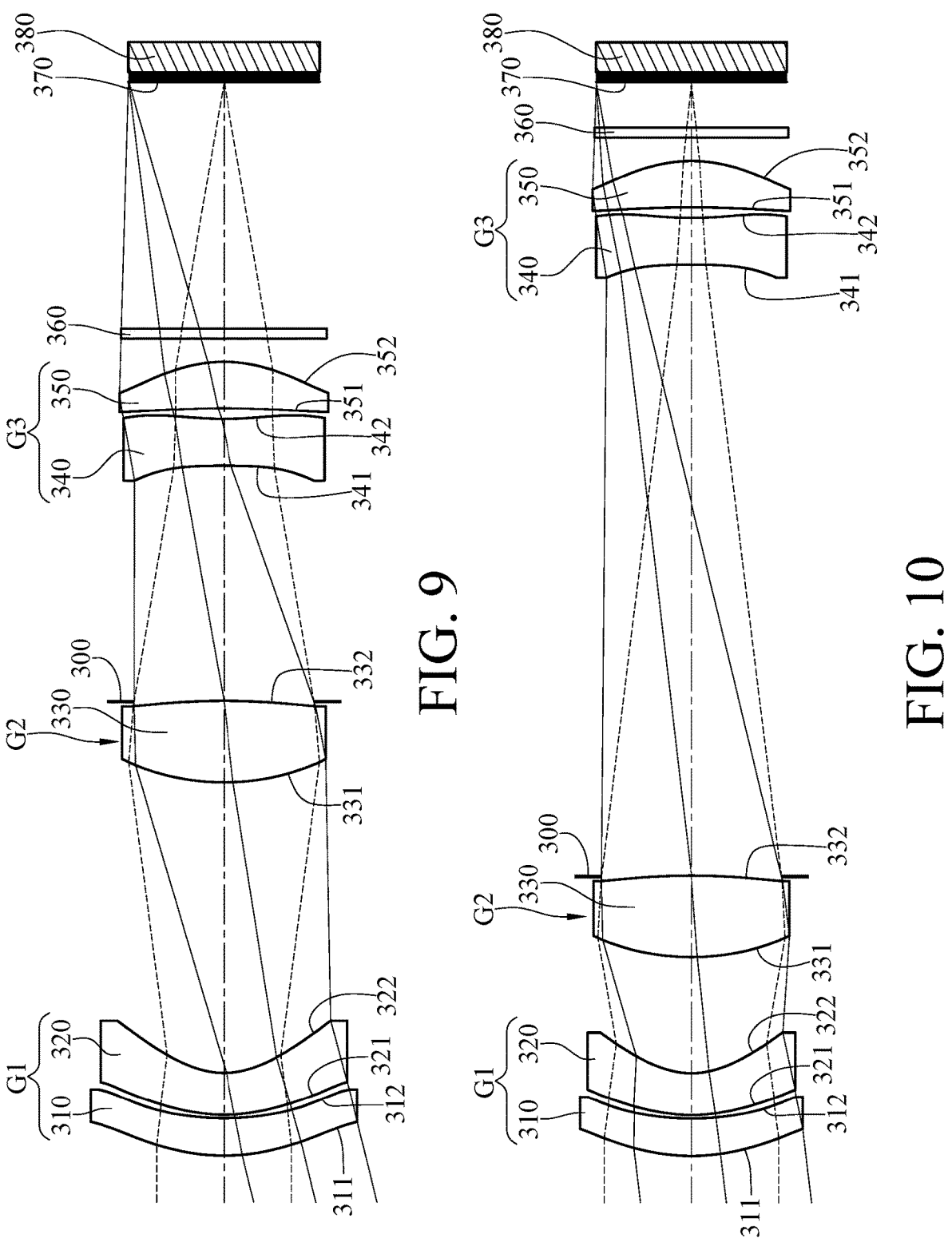
FIG. 9 is a schematic view of an image capturing unit at the short-focal-length end according to the 3rd embodiment of the present disclosure.
FIG. 10 is a schematic view of the image capturing unit at the long-focal-length end according to the 3rd embodiment of the present disclosure.
Figure 11:
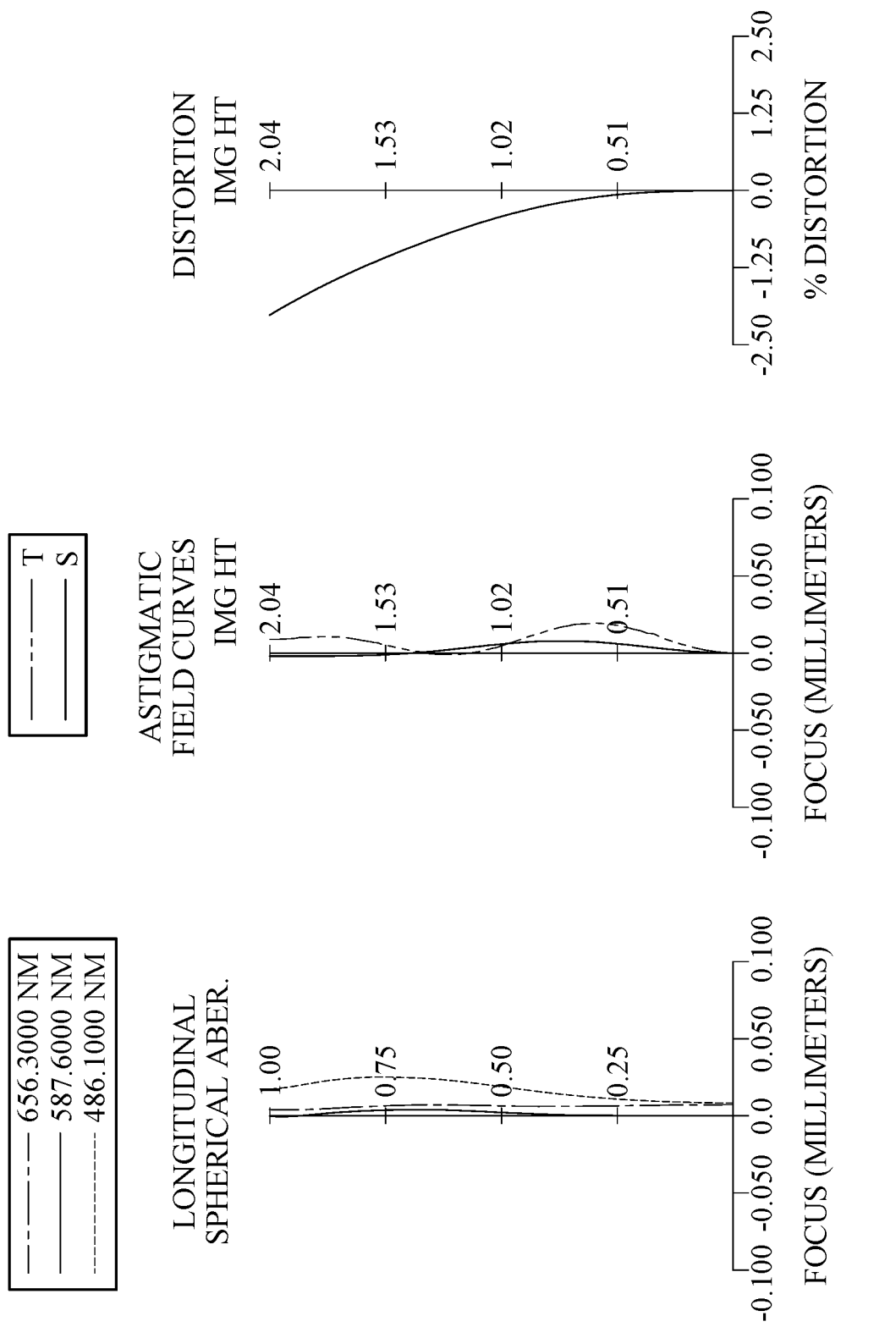
FIG. 11 shows spherical aberration curves, astigmatic field curves and a distortion curve of the image capturing unit at the short-focal-length end according to the 3rd embodiment.
Figure 12:
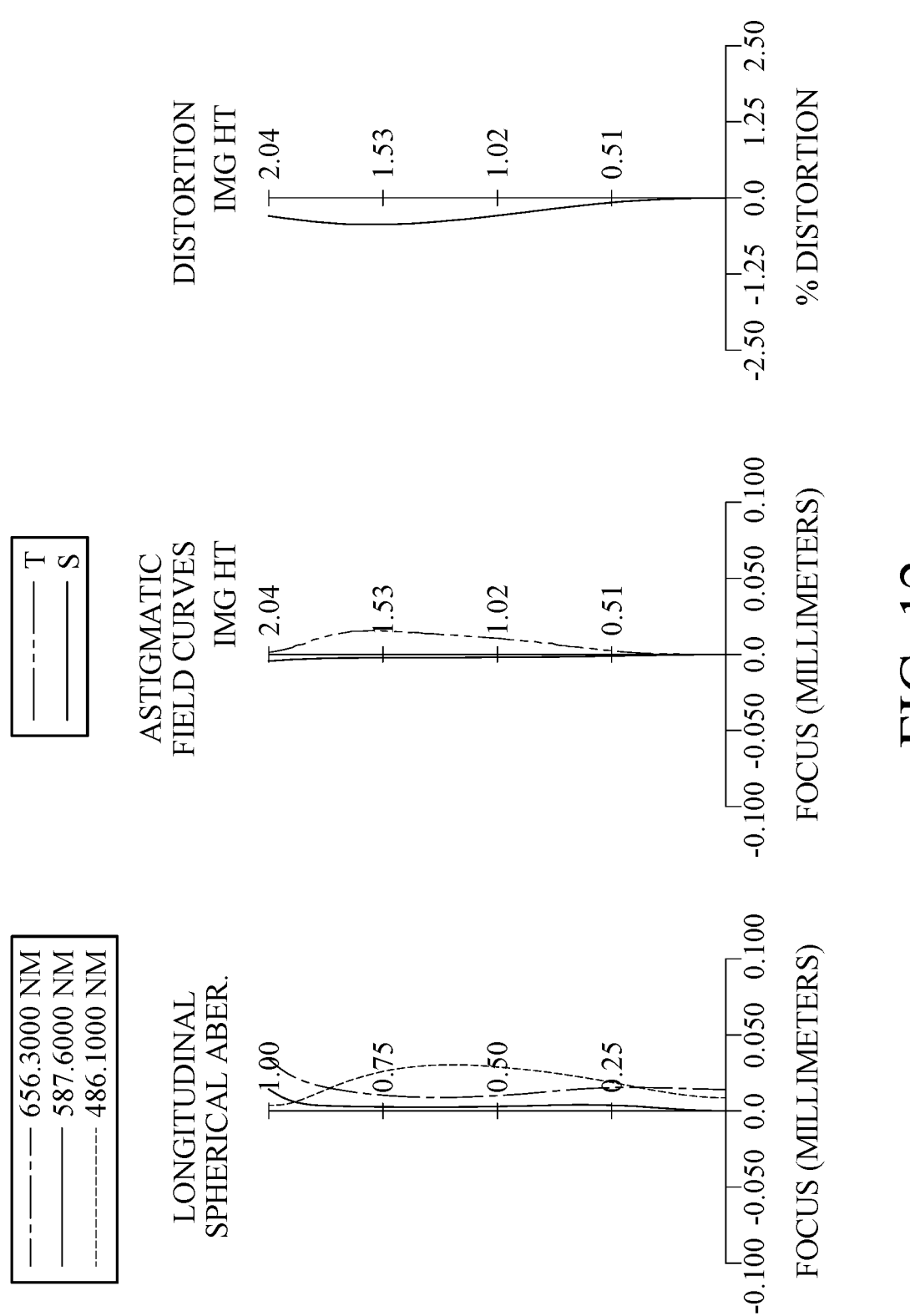
FIG. 12 shows spherical aberration curves, astigmatic field curves and a distortion curve of the image capturing unit at long-focal-length end according to the 3rd embodiment.

FIG. 9 is a schematic view of an image capturing unit at the short-focal-length end according to the 3rd embodiment of the present disclosure. FIG. 10 is a schematic view of the image capturing unit at the long-focal-length end according to the 3rd embodiment of the present disclosure. FIG. 11 shows, in order from left to right, spherical aberration curves, astigmatic field curves and a distortion curve of the image capturing unit at the short-focal-length end according to the 3rd embodiment. FIG. 12 shows, in order from left to

TABLE 6

| Surface # | 2 | 3 | 4 | 5 | 7 |
|---|---|---|---|---|---|
| | | | Aspheric Coefficients | | |
| k = | 2.1440E+00 | −1.2164E+01 | 9.0000E+01 | −3.9660E−01 | 1.8245E+00 |
| A4 = | 1.1343E−03 | 4.5782E−03 | −6.1112E−03 | −1.9055E−02 | −5.5965E−03 |
| A6 = | −4.3882E−05 | −4.2809E−04 | −1.0422E−03 | −1.1592E−03 | −2.6679E−03 |
| A8 = | 5.6591E−06 | 4.9721E−05 | 5.1482E−04 | 1.8142E−03 | 2.3114E−03 |
| A10 = | −2.3459E−07 | −3.9202E−06 | −8.9962E−05 | −8.2999E−04 | −1.5740E−03 |
| A12 = | — | 1.1627E−07 | 6.2505E−07 | 1.9367E−04 | 4.7261E−04 |
| A14 = | — | — | 1.0890E−06 | −1.8211E−05 | −6.2386E−05 |

| Surface # | 8 | 9 | 10 | 11 | 12 |
|---|---|---|---|---|---|
| k = | −1.6278E+00 | 4.0028E−01 | 2.1170E−01 | −2.7724E+01 | −8.3275E+00 |
| A4 = | 8.5408E−03 | 1.5154E−02 | 2.6656E−03 | −4.9761E−02 | −4.7982E−02 |
| A6 = | −8.6474E−04 | −4.0856E−03 | −2.8539E−03 | −1.4010E−03 | 6.7439E−03 |
| A8 = | 2.0500E−03 | 2.9620E−03 | 3.0350E−03 | 3.3701E−03 | −7.3148E−04 |
| A10 = | −1.0850E−03 | −1.6111E−03 | −1.8618E−03 | −1.7942E−03 | 7.6516E−05 |
| A12 = | 3.0891E−04 | 5.7328E−04 | 6.5153E−04 | 4.9744E−04 | −2.2494E−05 |
| A14 = | −2.9893E−05 | −1.0918E−04 | −1.1641E−04 | −5.5854E−05 | 5.4062E−06 |
| A16 = | — | 9.0760E−06 | 8.2554E−06 | −3.9480E−07 | −6.2228E−07 | right, spherical aberration curves, astigmatic field curves and a distortion curve of the image capturing unit at long-focal-length end according to the 3rd embodiment. In FIG. 9 and FIG. 10, the image capturing unit includes the image capturing lens system (its reference numeral is omitted) of the present disclosure and an image sensor 380. The image capturing lens system includes, in order from an object side to an image side along an optical path, a first lens element 310, a second lens element 320, a third lens element 330, an aperture stop 300, a fourth lens element 340, a fifth lens element 350, a filter 360 and an image surface 370. In addition, the image capturing lens system has a configuration of a first lens group G1 including the first lens element 310 and the second lens element 320, a second lens group G2 including the third lens element 330 and the aperture stop 300, and a third lens group G3 including the fourth lens element 340 and the fifth lens element 350. The first lens group G1 has negative refractive power, the second lens group G2 has positive refractive power, and the third lens group G3 has positive refractive power. The image capturing lens system includes five lens elements (310, 320, 330, 340, and 350) with no additional lens element disposed between each of the adjacent five lens elements.

The focal length of the image capturing lens system is varied by changing axial distances between the three lens groups (G1, G2, and G3) in a zooming process. As shown in FIG. 9 and FIG. 10, the second lens group G2 is moved relative to the first lens group G1 along an optical axis in the zooming process, and the third lens group G3 is moved relative to the first lens group G1 along the optical axis in the zooming process. Furthermore, the image capturing lens system has a short-focal-length end as shown in FIG. 9 and a long-focal-length end as shown in FIG. 10. In addition, when the image capturing lens system is zooming from the short-focal-length end to the long-focal-length end, the second lens group G2 is moved along the optical axis toward the object side relative to the first lens group G1. It is noted that there is no relative motion between lens elements of each of the three lens groups in the zooming process.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The first lens element 310 has at least one inflection point in an off-axis region thereof.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The second lens element 320 has at least one inflection point in an off-axis region thereof.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The third lens element 330 has at least one inflection point in an off-axis region thereof.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric. The fourth lens element 340 has at least one inflection point and at least one critical point in an off-axis region thereof.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The fifth lens element 350 has at least one inflection point in an off-axis region thereof.

The filter 360 is made of glass material and located between the fifth lens element 350 and the image surface 370, and will not affect the focal length of the image capturing lens system. The image sensor 380 is disposed on or near the image surface 370.

In this embodiment, one of various focusing states of the image capturing lens system is provided, and the focusing state of the image capturing lens system is a state where the image capturing lens system focuses on an imaged object located at infinity.

The detailed optical data of the 3rd embodiment are shown in Table 7 and Table 8, and the aspheric surface data are shown in Table 9 below. In this embodiment, an axial distance between the second lens element 320 and the third lens element 330 is D4, an axial distance between the aperture stop 300 and the fourth lens element 340 is D7, and an axial distance between the filter 360 and the image surface 370 is D13.

TABLE 7

| 3rd Embodiment | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 4.472 | (ASP) | 0.800 | Plastic | 1.545 | 56.1 | 25.19 |
| 2 | | 6.215 | (ASP) | 0.074 | | | | |
| 3 | Lens 2 | 3.594 | (ASP) | 0.900 | Plastic | 1.587 | 28.3 | -6.91 |
| 4 | | 1.729 | (ASP) | D4 | | | | |
| 5 | Lens 3 | 5.206 | (ASP) | 1.744 | Plastic | 1.544 | 56.0 | 7.02 |
| 6 | | -12.633 | (ASP) | -0.020 | | | | |
| 7 | Ape. Stop | Plano | | D7 | | | | |
| 8 | Lens 4 | -16.945 | (ASP) | 1.000 | Plastic | 1.669 | 19.5 | -7.76 |
| 9 | | 7.666 | (ASP) | 0.227 | | | | |
| 10 | Lens 5 | -13.530 | (ASP) | 1.000 | Plastic | 1.544 | 56.0 | 7.03 |
| 11 | | -3.059 | (ASP) | 0.500 | | | | |
| 12 | Filter | Plano | | 0.210 | Glass | 1.517 | 64.2 | — |

TABLE 7-continued

| | | 3rd Embodiment | | | | | |
|---|---|---|---|---|---|---|---|
| Surface # | | Curvature Radius | Thickness | Material | Index | Abbe # | Focal Length |
| 13 | | Plano | D13 | | | | |
| 14 | Image | Plano | — | | | | |

Note:
Reference wavelength is 587.6 nm (d-line).

The definitions of these parameters shown in Table 8 are the same as those stated in the 1st embodiment with corresponding values for the 3rd embodiment, so an explanation in this regard will not be provided again.

Moreover, these parameters can be calculated from Table 7 and Table 9 as the following values and satisfy the following conditions:

TABLE 8

| | 3rd Embodiment | | | | | |
|---|---|---|---|---|---|---|
| | Short-focal-length End | Long-focal-length End | | | | |
| f[mm] | 8.51 | 17.00 | fG1 [mm] | −11.38 | \|f2/f1\| | 0.27 |
| Fno | 3.05 | 4.55 | fG2 [mm] | 7.02 | \|fG2/fG3\| | 0.25 |
| HFOV [deg.] | 13.7 | 6.9 | fG3 [mm] | 27.95 | f2/f3 | −0.98 |
| D4 [mm] | 6.227 | 2.484 | (Vi/Ni)min | 11.65 | fG1/fG2 | −1.62 |
| D7 [mm] | 5.056 | 13.110 | V3/V4 | 2.88 | fG3/(BLL − BLS) | −6.49 |
| D13 [mm] | 5.286 | 0.981 | (TG12L − TG12S)/TG2 | −2.15 | fL/fS | 2.00 |
| | | | \|TLL/TLS − 1\| | 2.23E−04 | fS/fG1 | −0.75 |
| | | | TG1/TG3 | 0.80 | fS/fG2 | 1.21 |
| | | | TG2/TG3 | 0.78 | fS/fG3 | 0.30 |
| | | | TLL/fL | 1.35 | Y11L/ImgHL | 1.17 |
| | | | TLL/ImgHL | 11.28 | Y11L/Y52L | 1.12 |
| | | | TLS/ImgHS | 11.28 | Y11S/ImgHS | 1.40 |
| | | | (R5 + R6)/(R5 − R6) | −0.42 | Y11S/Y52S | 1.27 |
| | | | (R9 + R10)/(R9 − R10) | 1.58 | — | — |

In the 3rd embodiment, the equation of the aspheric surface profiles of the aforementioned lens elements is the same as the equation of the 1st embodiment, so an explanation in this regard will not be provided again.

4th Embodiment

Figures 13, 14:
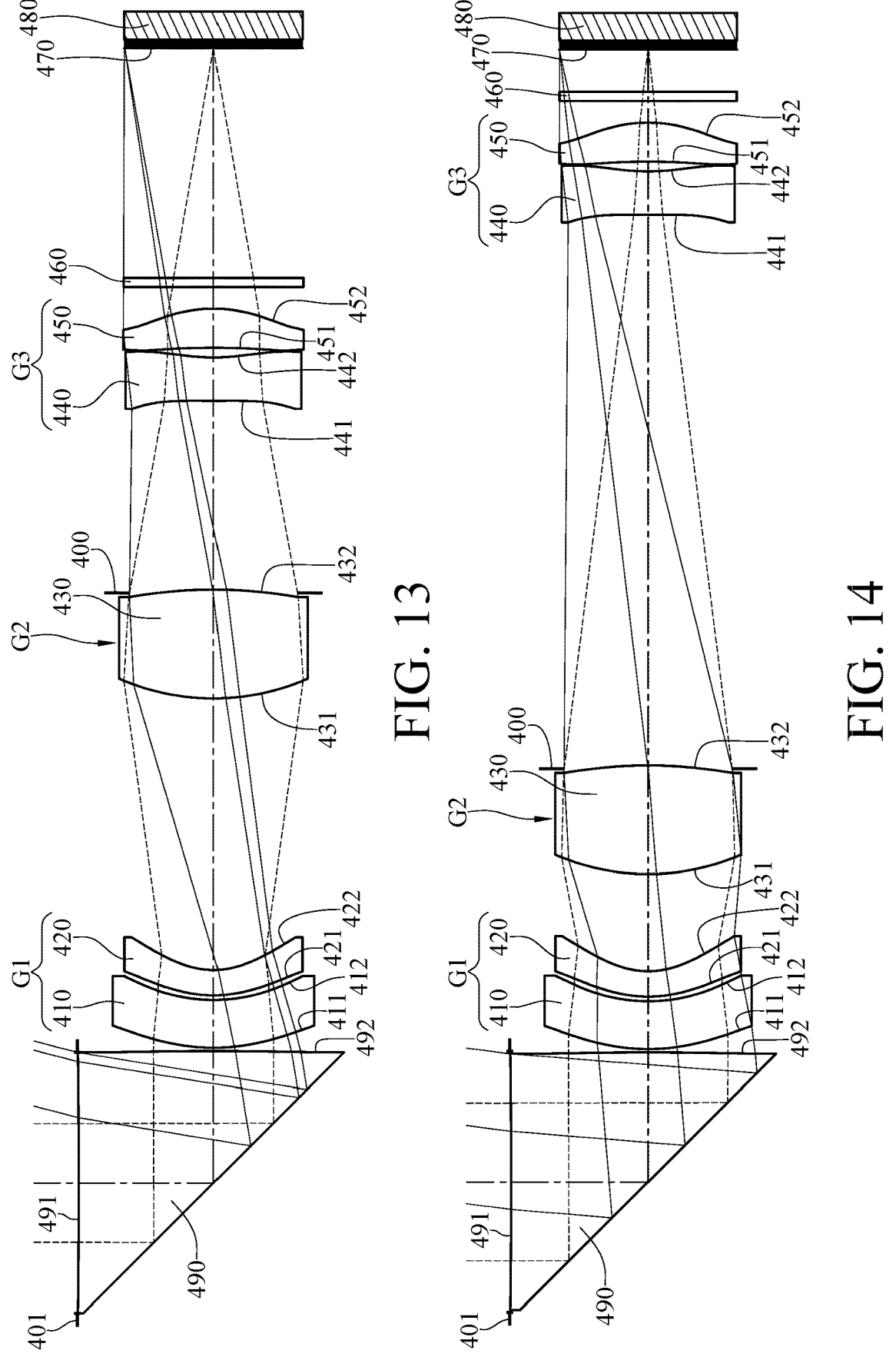
FIG. 13 is a schematic view of an image capturing unit at the short-focal-length end according to the 4th embodiment of the present disclosure.
FIG. 14 is a schematic view of the image capturing unit at the long-focal-length end according to the 4th embodiment of the present disclosure.
Figure 15:
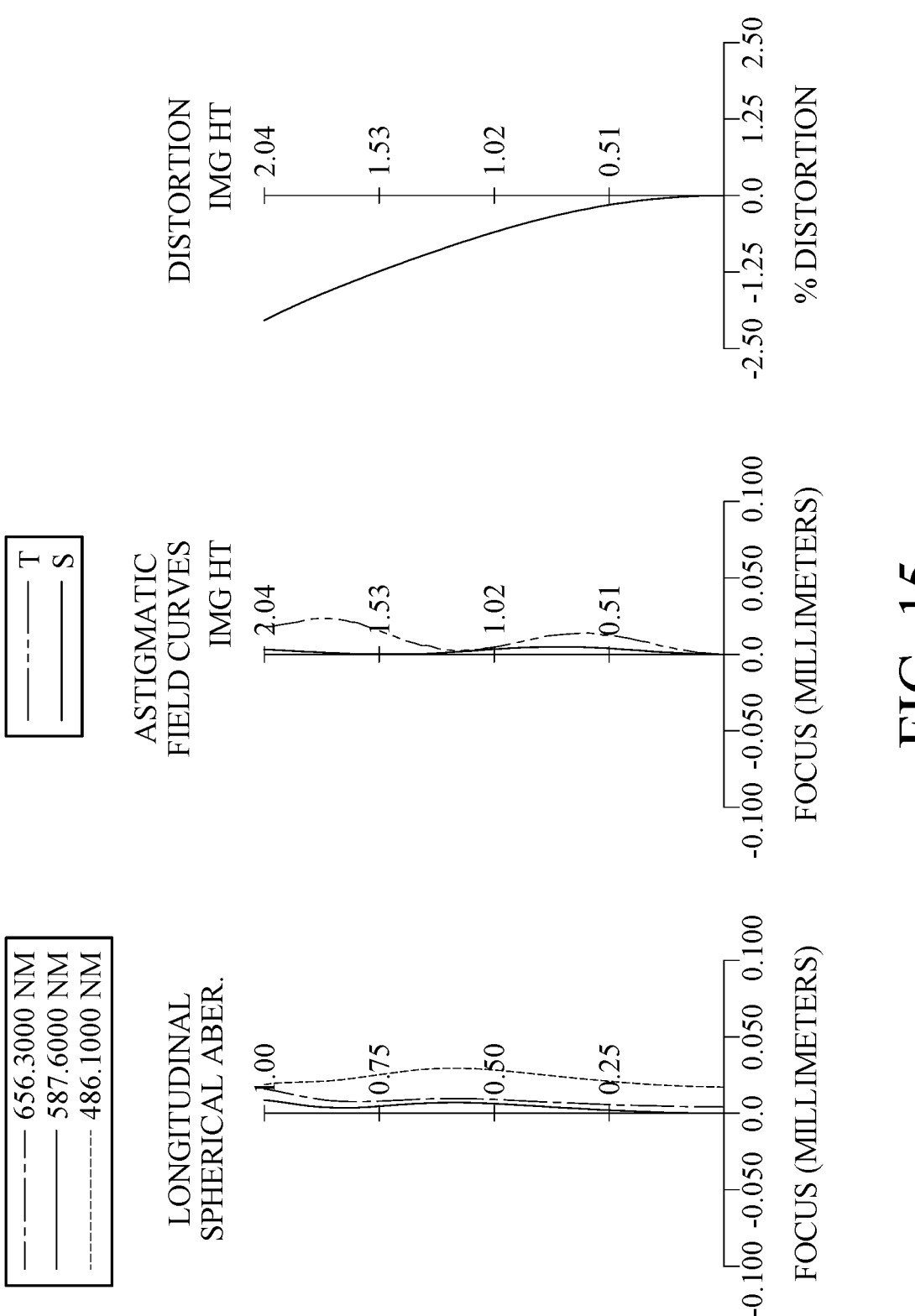
FIG. 15 shows spherical aberration curves, astigmatic field curves and a distortion curve of the image capturing unit at the short-focal-length end according to the 4th embodiment.
Figure 16:
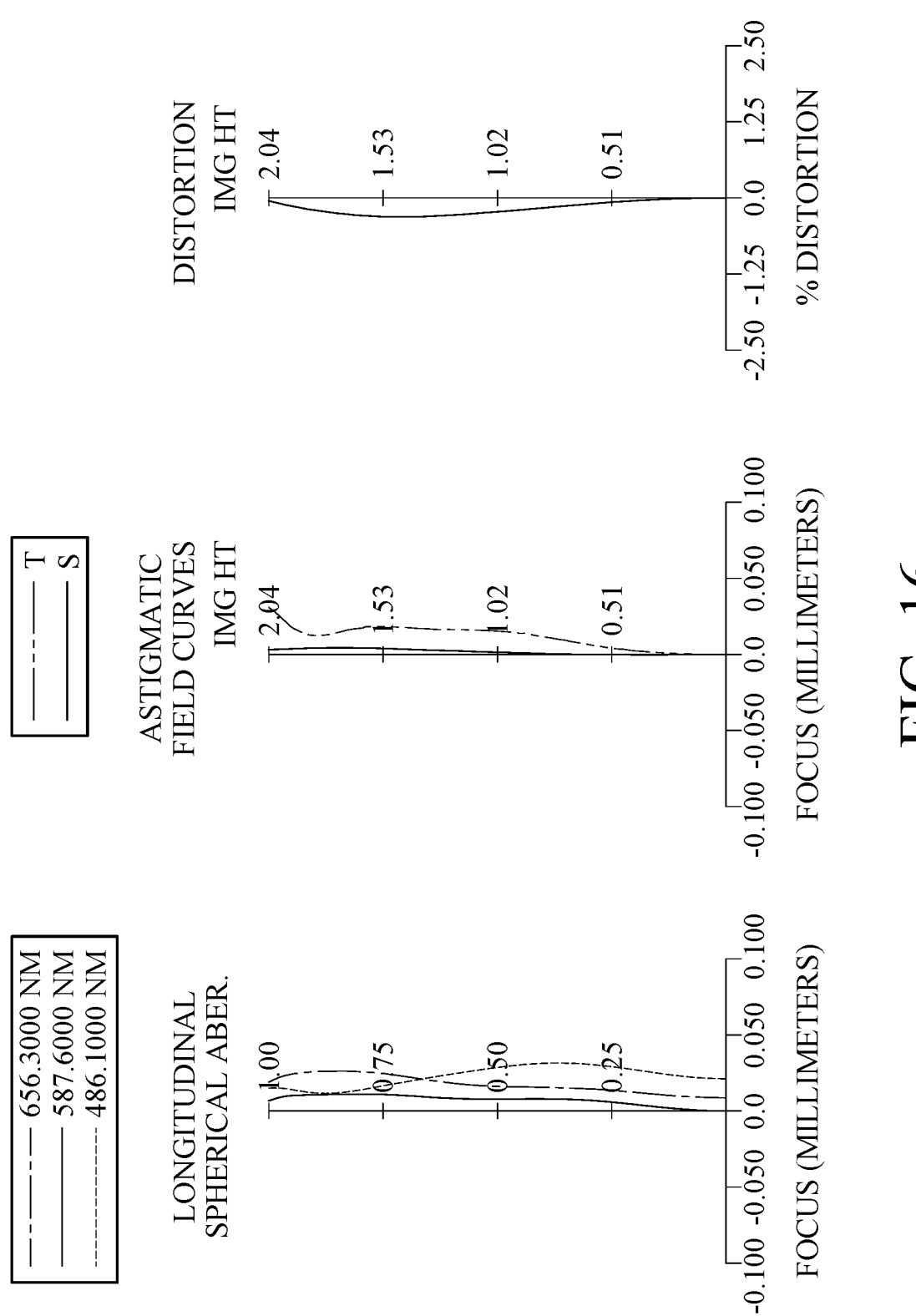
FIG. 16 shows spherical aberration curves, astigmatic field curves and a distortion curve of the image capturing unit at long-focal-length end according to the 4th embodiment.

FIG. 13 is a schematic view of an image capturing unit at the short-focal-length end according to the 4th embodiment of the present disclosure. FIG. 14 is a schematic view of the image capturing unit at the long-focal-length end according to the 4th embodiment of the present disclosure. FIG. 15 shows, in order from left to right, spherical aberration curves, astigmatic field curves and a distortion curve of the image capturing unit at the short-focal-length end according to the 4th embodiment. FIG. 16 shows, in order from left to

TABLE 9

| | Aspheric Coefficients | | | | |
|---|---|---|---|---|---|
| Surface # | 1 | 2 | 3 | 4 | 5 |
| k = | −1.8080E+00 | −1.8716E−02 | −2.2343E+00 | −1.6674E+00 | 2.8397E+00 |
| A4 = | 8.5525E−04 | 2.4496E−03 | −8.6620E−03 | −7.0849E−03 | −2.5280E−03 |
| A6 = | −1.9241E−04 | 1.8622E−04 | 1.7153E−03 | 1.0049E−03 | −2.8330E−05 |
| A8 = | −4.1025E−06 | −1.2454E−06 | −1.3819E−04 | −3.8075E−06 | −9.1157E−05 |
| A10 = | −2.1704E−06 | −6.3046E−06 | 3.2530E−05 | −3.8365E−05 | 3.6043E−05 |
| A12 = | −3.8218E−08 | −3.6511E−07 | −1.3231E−05 | 1.0204E−05 | −1.0256E−05 |
| A14 = | 3.9027E−09 | −6.7652E−08 | 2.6463E−06 | −1.3637E−06 | 1.4821E−06 |
| A16 = | 1.2853E−09 | −1.6299E−09 | −2.8629E−07 | 6.8695E−08 | −1.0046E−07 |
| A18 = | — | 1.3231E−09 | 1.2491E−08 | — | — |

| | | | | | |
|---|---|---|---|---|---|
| Surface # | 6 | 8 | 9 | 10 | 11 |
| k = | −8.0494E+01 | 5.0000E+00 | −6.9986E+01 | −6.2362E+01 | −5.2428E+00 |
| A4 = | −3.7709E−03 | −1.8585E−02 | 1.3837E−02 | 1.8408E−02 | −1.2763E−02 |
| A6 = | 1.4539E−03 | −2.7613E−03 | −1.8018E−02 | −9.7685E−04 | 6.5829E−04 |
| A8 = | −3.9902E−04 | 2.4406E−03 | 6.7447E−03 | 1.4557E−03 | 1.6555E−03 |
| A10 = | 1.1911E−04 | −6.9649E−04 | −1.4084E−03 | 3.3874E−04 | −9.0256E−04 |
| A12 = | −2.3765E−05 | 1.0151E−04 | 1.5930E−04 | −1.4676E−04 | 2.5159E−04 |
| A14 = | 2.8158E−06 | −5.5754E−06 | −7.3197E−06 | 1.9395E−05 | −3.4681E−05 |
| A16 = | −1.3604E−07 | — | — | −9.5792E−07 | 1.8135E−06 | right, spherical aberration curves, astigmatic field curves and a distortion curve of the image capturing unit at long-focal-length end according to the 4th embodiment. In FIG. 13 and FIG. 14, the image capturing unit includes the image capturing lens system (its reference numeral is omitted) of the present disclosure and an image sensor 480. The image capturing lens system includes, in order from an object side to an image side along an optical path, a stop 401, a reflective prism 490, a first lens element 410, a second lens element 420, a third lens element 430, an aperture stop 400, a fourth lens element 440, a fifth lens element 450, a filter 460 and an image surface 470. In addition, the image capturing lens system has a configuration of a first lens group G1 including the first lens element 410 and the second lens element 420, a second lens group G2 including the third lens element 430 and the aperture stop 400, and a third lens group G3 including the fourth lens element 440 and the fifth lens element 450. The first lens group G1 has negative refractive power, the second lens group G2 has positive refractive power, and the third lens group G3 has positive refractive power. The image capturing lens system includes five lens elements (410, 420, 430, 440, and 450) with no additional lens element disposed between each of the adjacent five lens elements.

The focal length of the image capturing lens system is varied by changing axial distances between the three lens groups (G1, G2, and G3) in a zooming process. As shown in FIG. 13 and FIG. 14, the second lens group G2 is moved relative to the first lens group G1 along an optical axis in the zooming process, and the third lens group G3 is moved relative to the first lens group G1 along the optical axis in the zooming process. Furthermore, the image capturing lens system has a short-focal-length end as shown in FIG. 13 and a long-focal-length end as shown in FIG. 14. In addition, when the image capturing lens system is zooming from the short-focal-length end to the long-focal-length end, the second lens group G2 is moved along the optical axis toward the object side relative to the first lens group G1. It is noted that there is no relative motion between lens elements of each of the three lens groups in the zooming process.

The reflective prism 490 with positive refractive power has an object-side surface 491 being concave in a paraxial region thereof and an image-side surface 492 being convex in a paraxial region thereof. The reflective prism 490 is made of plastic material and has the object-side surface 491 and the image-side surface 492 being both aspheric. The reflective prism 490 is a light-folding element configured for reflecting incident light, such that the optical path is deflected at the reflective prism 490.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The first lens element 410 has at least one inflection point in an off-axis region thereof.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The second lens element 420 has at least one inflection point in an off-axis region thereof.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The fourth lens element 440 has at least one inflection point and at least one critical point in an off-axis region thereof.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The fifth lens element 450 has at least one inflection point and at least one critical point in an off-axis region thereof.

The filter 460 is made of glass material and located between the fifth lens element 450 and the image surface 470, and will not affect the focal length of the image capturing lens system. The image sensor 480 is disposed on or near the image surface 470.

In this embodiment, one of various focusing states of the image capturing lens system is provided, and the focusing state of the image capturing lens system is a state where the image capturing lens system focuses on an imaged object located at infinity.

The detailed optical data of the 4th embodiment are shown in Table 10 and Table 11, and the aspheric surface data are shown in Table 12 below. In this embodiment, an axial distance between the second lens element 420 and the third lens element 430 is D7', an axial distance between the aperture stop 400 and the fourth lens element 440 is D10, and an axial distance between the filter 460 and the image surface 470 is D16.

TABLE 10

| | | | | | | | |
|---|---|---|---|---|---|---|---|
| 4th Embodiment | | | | | | | |
| Surface # | | Curvature Radius | | Thickness | Material | Index | Abbe # | Focal Length |
| 0 | Object | Plano | | Infinity | | | | |
| 1 | Stop | Plano | | 0.029 | | | | |
| 2 | Reflective Prism | −298.841 | (ASP) | 6.133 | Plastic | 1.534 | 56.0 | 162.21 |
| 3 | | −67.663 | (ASP) | 0.077 | | | | |
| 4 | Lens 1 | 4.673 | (ASP) | 1.104 | Plastic | 1.545 | 56.1 | −123.15 |
| 5 | | 4.005 | (ASP) | 0.104 | | | | |
| 6 | Lens 2 | 2.917 | (ASP) | 0.584 | Plastic | 1.639 | 23.3 | −9.60 |

TABLE 10-continued

| Surface # | | Curvature Radius | | Thickness | Material | Index | Abbe # | Focal Length |
|---|---|---|---|---|---|---|---|---|
| | | | | 4th Embodiment | | | | |
| 7 | | 1.823 | (ASP) | D7' | | | | |
| 8 | Lens 3 | 5.294 | (ASP) | 2.500 | Plastic | 1.544 | 56.0 | 6.78 |
| 9 | | −10.129 | (ASP) | −0.076 | | | | |
| 10 | Ape. Stop | Plano | | D10 | | | | |
| 11 | Lens 4 | 50.741 | (ASP) | 1.000 | Plastic | 1.679 | 18.4 | −7.50 |
| 12 | | 4.590 | (ASP) | 0.227 | | | | |
| 13 | Lens 5 | −13.213 | (ASP) | 0.898 | Plastic | 1.544 | 56.0 | 7.32 |
| 14 | | −3.134 | (ASP) | 0.500 | | | | |
| 15 | Filter | Plano | | 0.210 | Glass | 1.517 | 64.2 | — |
| 16 | | Plano | | D16 | | | | |
| 17 | Image | Plano | | — | | | | |

Note:
Reference wavelength is 587.6 nm (d-line).
An effective radius of the stop 401 (Surface 1) is 3.000 mm.

The definitions of these parameters shown in Table 11 are the same as those stated in the 1st embodiment with corresponding values for the 4th embodiment, so an explanation in this regard will not be provided again.

Moreover, these parameters can be calculated from Table 10 and Table 12 as the following values and satisfy the following conditions:

TABLE 11

| | Short-focal-length End | Long-focal-length End | | | | |
|---|---|---|---|---|---|---|
| | | | 4th Embodiment | | | |
| f[mm] | 8.00 | 16.00 | fG1 [mm] | −9.55 | \|f2/f1\| | 0.08 |
| Fno | 2.93 | 4.41 | fG2 [mm] | 6.78 | \|fG2/fG3\| | 0.13 |
| HFOV [deg.] | 14.6 | 7.3 | fG3 [mm] | 50.80 | f2/f3 | −1.42 |
| D7' [mm] | 6.253 | 2.237 | (Vi/Ni)min | 10.98 | fG1/fG2 | −1.41 |
| D10 [mm] | 4.418 | 12.743 | V3/V4 | 3.04 | fG3/(BLL − BLS) | −11.79 |
| D16 [mm] | 5.283 | 0.974 | (TG12L − TG12S)/TG2 | −1.61 | fL/fS | 2.00 |
| | | | \|TLL/TLS − 1\| | 1.49E−05 | fS/fG1 | −0.84 |
| | | | TG1/TG3 | 0.84 | fS/fG2 | 1.18 |
| | | | TG2/TG3 | 1.18 | fS/fG3 | 0.16 |
| | | | TLL/fL | 1.44 | Y11L/ImgHL | 1.17 |
| | | | TLL/ImgHL | 11.28 | Y11L/Y52L | 1.17 |
| | | | TLS/ImgHS | 11.28 | Y11S/ImgHS | 1.14 |
| | | | (R5+R6)/(R5 − R6) | −0.31 | Y11S/Y52S | 1.12 |
| | | | (R9+R10)/(R9 − R10) | 1.62 | — | — |

In the 4th embodiment, the equation of the aspheric surface profiles of the aforementioned lens elements is the same as the equation of the 1st embodiment, so an explanation in this regard will not be provided again.

TABLE 12

| Surface # | 2 | 3 | 4 | 5 | 6 | 7 |
|---|---|---|---|---|---|---|
| | | | Aspheric Coefficients | | | |
| k = | 0.0000E+00 | 0.0000E+00 | −2.1261E+00 | −3.5827E−01 | −2.3021E+00 | −1.7406E+00 |
| A4 = | −1.1092E−04 | 4.8876E−04 | 4.8486E−04 | 2.0411E−03 | −7.3301E−03 | −9.5186E−03 |
| A6 = | 1.3770E−05 | 4.9794E−05 | −3.0193E−04 | −1.4178E−05 | 2.5739E−03 | 2.7212E−03 |
| A8 = | −6.9661E−07 | −1.2500E−05 | 8.3063E−07 | −5.3669E−05 | −4.8347E−04 | −8.9803E−04 |
| A10 = | — | — | 7.4086E−07 | −1.5023E−05 | −1.7654E−05 | 2.4090E−04 |
| A12 = | — | — | 3.9336E−07 | −1.4033E−06 | 2.7185E−05 | −8.0331E−05 |
| A14 = | — | — | 1.4769E−08 | −1.2189E−07 | −1.2955E−05 | 1.5380E−05 |
| A16 = | — | — | −1.5224E−08 | 2.4405E−08 | 2.5199E−06 | −9.3673E−07 |
| A18 = | — | — | — | 1.4984E−08 | −1.4660E−07 | — |

| Surface # | 8 | 9 | 11 | 12 | 13 | 14 |
|---|---|---|---|---|---|---|
| k = | 2.7191E+00 | −4.1782E+01 | −8.0000E+01 | −2.5139E+01 | −3.9337E+01 | −7.3973E+00 |
| A4 = | −2.9874E−03 | −4.4364E−03 | −2.1929E−02 | 1.2260E−02 | 9.0922E−03 | −2.2031E−02 |

TABLE 12-continued

| | | | Aspheric Coefficients | | | |
|---|---|---|---|---|---|---|
| A6 = | −6.0021E−05 | 1.0978E−03 | −2.2859E−03 | −2.1963E−02 | −5.7658E−03 | 6.3533E−03 |
| A8 = | −9.5802E−05 | −2.6788E−04 | 2.8790E−03 | 8.5705E−03 | −4.1173E−03 | −1.1477E−03 |
| A10 = | 3.7966E−05 | 7.5373E−05 | −1.1392E−03 | −1.2752E−03 | 5.4841E−03 | 5.0289E−04 |
| A12 = | −1.1136E−05 | −1.6446E−05 | 2.3471E−04 | −1.8003E−05 | −1.9969E−03 | −9.5407E−05 |
| A14 = | 1.6255E−06 | 2.2658E−06 | −1.7690E−05 | 1.6110E−05 | 3.1274E−04 | 6.3978E−06 |
| A16 = | −1.0496E−07 | −1.3832E−07 | — | — | −1.8366E−05 | −3.8403E−07 |

5th Embodiment

Figure 17:
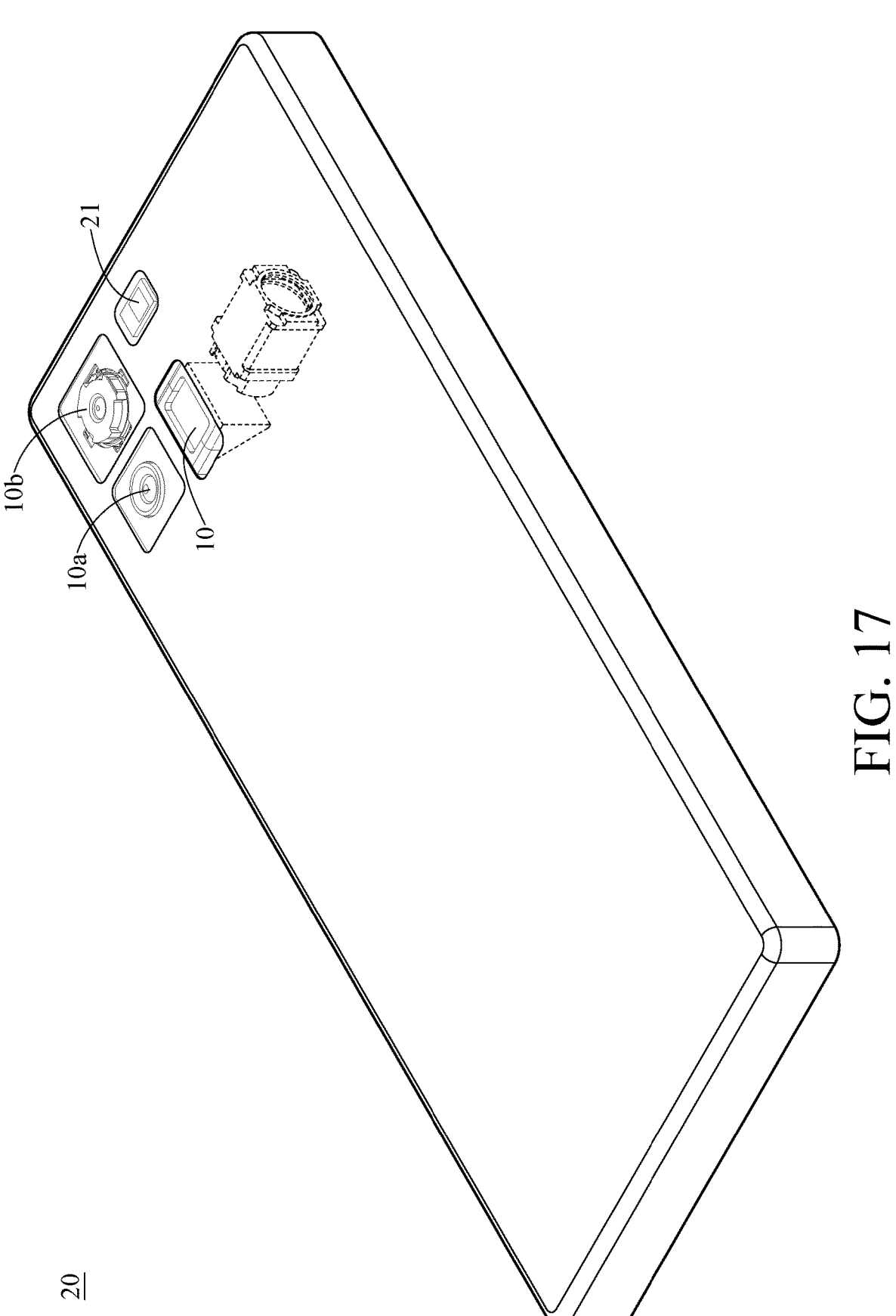
FIG. 17 is one perspective view of an electronic device according to the 5th embodiment of the present disclosure.
Figure 18:
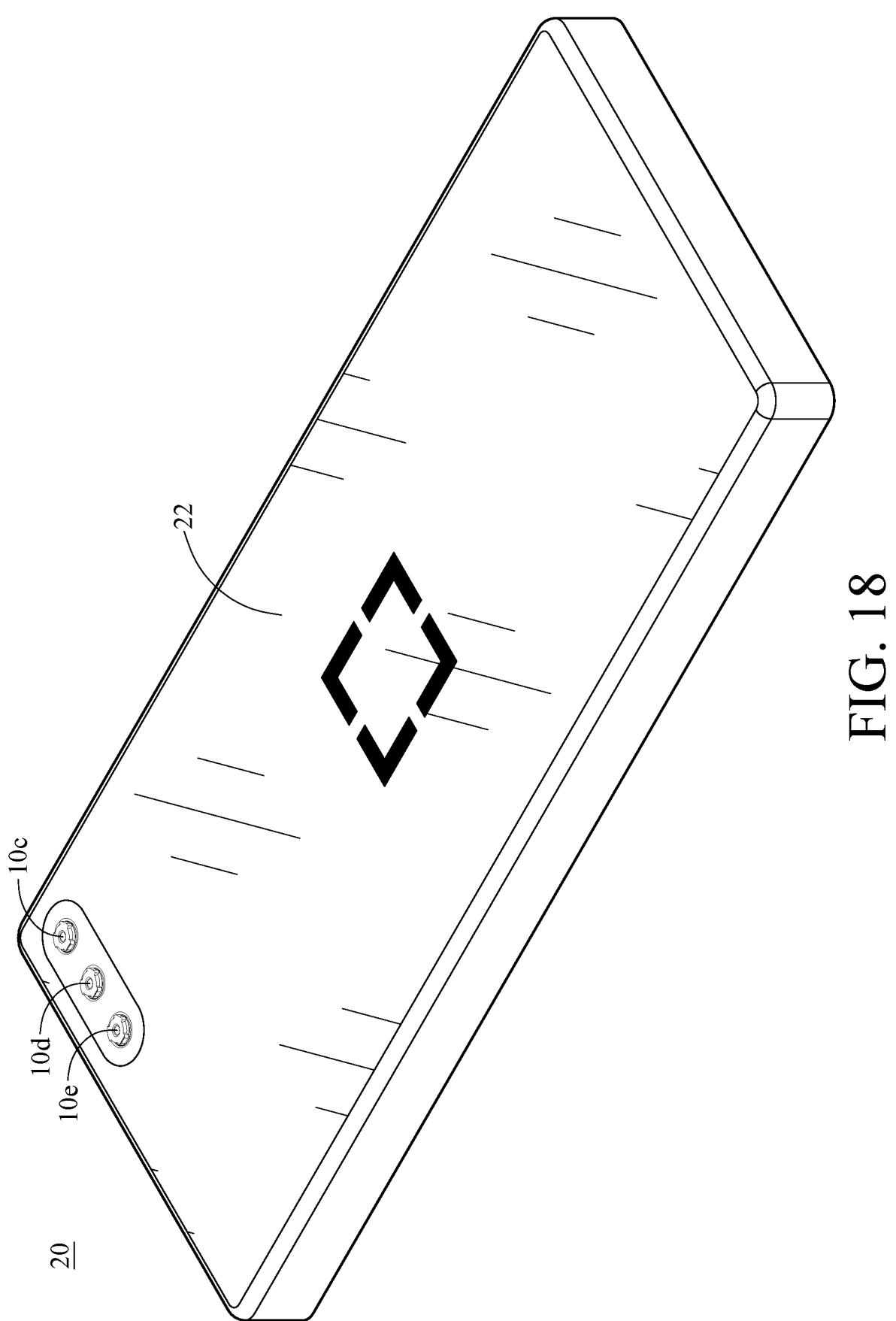
FIG. 18 is another perspective view of the electronic device in FIG. 17.
Figure 19:
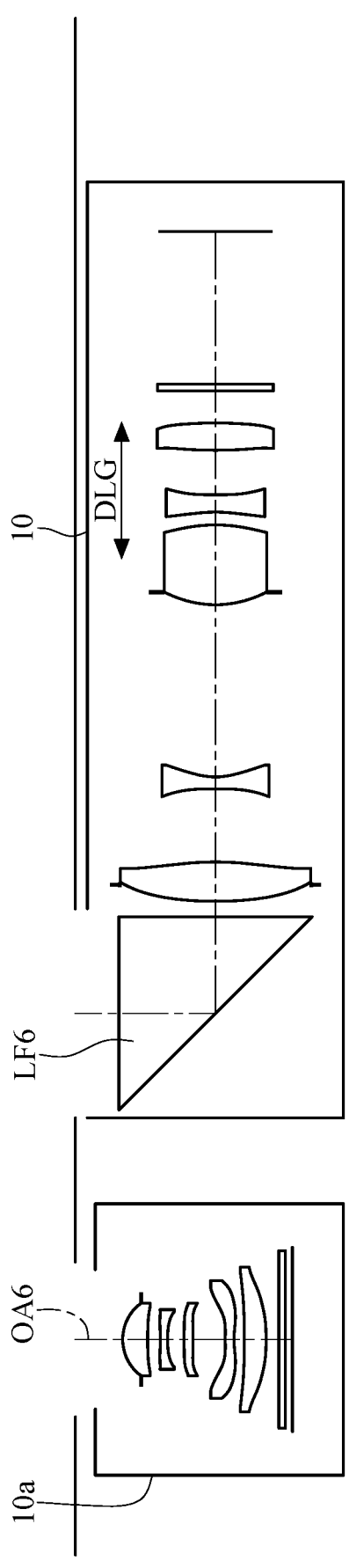
FIG. 19 is a cross-sectional view of two image capturing units of the electronic device in FIG. 17.

FIG. 17 is one perspective view of an electronic device according to the 5th embodiment of the present disclosure. FIG. 18 is another perspective view of the electronic device in FIG. 17. FIG. 19 is a cross-sectional view of two image capturing units of the electronic device in FIG. 17.

In this embodiment, an electronic device 20 is a smartphone including an image capturing unit 10, an image capturing unit 10a, an image capturing unit 10b, an image capturing unit 10c, an image capturing unit 10d, an image capturing unit 10e, a flash module 21, a display unit 22, a focus assist module, an image signal processor and an image software processor.

In this embodiment, the image capturing unit 10 is a camera module including a lens unit, a driving device, an image sensor and an image stabilizer. The lens unit includes the image capturing lens system disclosed in the 1st embodiment, a barrel and a holder member. However, the lens unit may alternatively be provided with the image capturing lens system disclosed in other embodiments, and the present disclosure is not limited thereto. In addition, the image capturing unit 10 is a telephoto image capturing unit configured with a light-folding element LF6, and the light-folding element LF6 is disposed on the object side of the first lens element. Therefore, it is favorable for adjusting light travelling direction and folding optical axis, so that the total track length of the image capturing unit 10 and the thickness of the electronic device 20 are not restricted by each other. The imaging light converges in the lens unit of the image capturing unit 10 to generate an image with the driving device utilized for image zooming or focusing on the image sensor, and the generated image is then digitally transmitted to other electronic component for further processing.

The driving device can have zooming functionality or auto focusing functionality, and different driving configurations can be obtained through the usages of screws, voice coil motors (VCM) such as spring type or ball type, micro electro-mechanical systems (MEMS), piezoelectric systems, or shape memory alloy materials. The driving device is favorable for obtaining a better imaging position of the lens unit, so that a clear image of the imaged object can be captured by the lens unit with different object distances. The image sensor (for example, CCD or CMOS), which can feature high photosensitivity and low noise, is disposed on the image surface of the image capturing lens system to provide higher image quality.

The image stabilizer, such as an accelerometer, a gyro sensor and a Hall Effect sensor, is configured to work with the driving device to provide optical image stabilization (OIS). The driving device working with the image stabilizer is favorable for compensating for pan and tilt of the lens unit to reduce blurring associated with motion during exposure. In some cases, the compensation can be provided by elec-tronic image stabilization (EIS) with image processing software, thereby improving image quality while in motion or low-light conditions.

The image capturing units 10, 10a, 10b are disposed on the same side of the electronic device 20, and the image capturing units 10c, 10d, 10e and the display unit 22 are disposed on the opposite side of the electronic device 20. Each of the image capturing units 10a, 10b, 10c, 10d, 10e can have a configuration similar to that of the image capturing unit 10, so the details in this regard will not be provided again. The image capturing unit 10a includes an optical lens assembly and an image sensor (their reference numerals are omitted). As shown in FIG. 19, the optical lens assembly of the image capturing unit 10a has an optical axis OA6, and a movement direction DLG of lens groups of the image capturing unit 10 is perpendicular to the optical axis OA6; furthermore, the movement direction DLG of lens groups of the image capturing unit 10 is also perpendicular to an optical axis of the image capturing unit 10b. Therefore, it is favorable for adjusting space arrangement so as to reduce the thickness of the electronic device.

The image capturing unit 10 is a telephoto image capturing unit configured with a light-folding element, the image capturing unit 10a is a telephoto image capturing unit, and the image capturing unit 10b is a wide angle image capturing unit. Half of a maximum field of view of the image capturing unit 10a ranges between 15 degrees and 30 degrees, and half of a maximum field of view of the image capturing unit 10b ranges between 30 degrees and 60 degrees. In other configurations, half of the maximum field of view of the image capturing unit 10b can range between 35 degrees and 50 degrees. The image capturing units 10, 10a, 10b have different fields of view, such that the electronic device 20 can have a larger zoom ratio for more applications. The above-mentioned electronic device 20 has the three image capturing units 10, 10a, 10b on the same side, but the present disclosure is not limited thereto. In other configurations, the electronic device may have at least two image capturing units disposed on the same side or have at least three image capturing units disposed on the same side.

The image capturing unit 10c is a wide angle image capturing unit, the image capturing unit 10d is an ultra-wide-angle image capturing unit, and the image capturing unit 10e is a ToF (time of flight) image capturing unit, wherein the image capturing unit 10e can determine depth information of the imaged object. The image capturing units 10c, 10d, 10e and the display unit 22 are disposed on the same side of the electronic device 20, such that the image capturing units 10c, 10d, 10e can be front-facing cameras of the electronic device 20 for taking selfies, but the present disclosure is not limited thereto.

The electronic device 20 includes multiple image capturing units 10, 10a, 10b, 10c, 10d, 10e, but the present disclosure is not limited to the number and arrangement of image capturing units.

When a user captures images of an object, the light rays converge in the image capturing units 10, 10a or 10b to generate an image(s), and the flash module 21 is activated for light supplement. The focus assist module detects the object distance of the imaged object to achieve fast auto focusing. The image signal processor is configured to optimize the captured image to improve image quality. The light beam emitted from the focus assist module can be either conventional infrared or laser. In addition, the light rays may converge in the image capturing units 10c, 10d or 10e to generate an image(s). The display unit 22 can be a touch screen, and the user is able to interact with the display unit 22 and the image software processor having multiple functions to capture images and complete image processing. Alternatively, the user may capture images via a physical button. The image processed by the image software processor can be displayed on the display unit 22.

6th Embodiment

Figure 20:
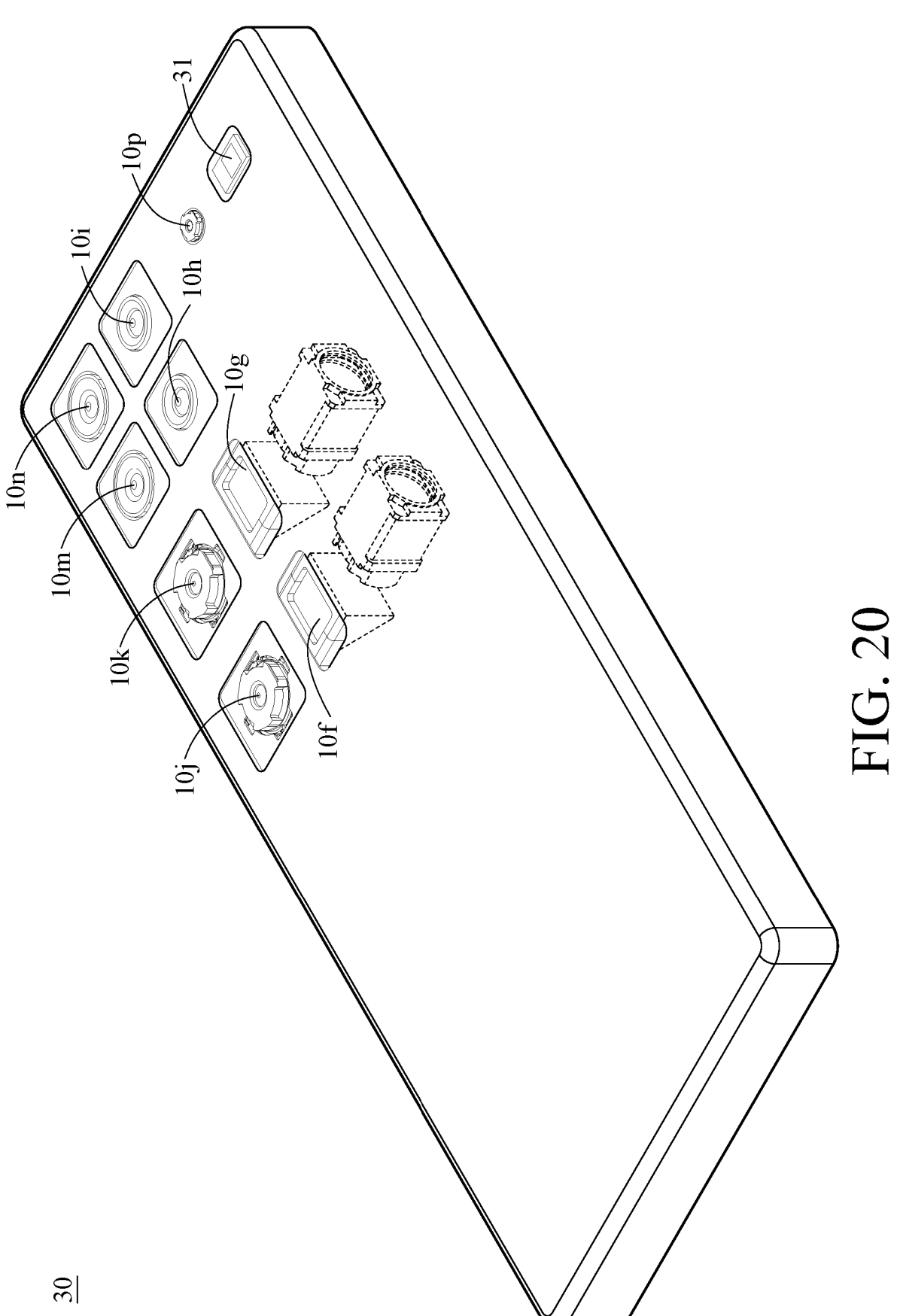
FIG. 20 is a perspective view of an electronic device according to the 6th embodiment of the present disclosure.

FIG. 20 is a perspective view of an electronic device according to the 6th embodiment of the present disclosure.

In this embodiment, an electronic device 30 is a smartphone including an image capturing unit 10f, an image capturing unit 10g, an image capturing unit 10h, an image capturing unit 10i, an image capturing unit 10j, an image capturing unit 10k, an image capturing unit 10m, an image capturing unit 10n, an image capturing unit 10p, a flash module 31, a focus assist module, an image signal processor, a display unit and an image software processor (not shown). The image capturing units 10f, 10g, 10h, 10i, 10j, 10k, 10m, 10n, 10p are disposed on the same side of the electronic device 30, and the display unit is disposed on the opposite side of the electronic device 30. Each of the image capturing units 10f, 10g, 10h, 10i, 10j, 10k, 10m, 10n, 10p can include the image capturing lens system of the present disclosure and can have a configuration similar to that of the image capturing unit 10, so the details in this regard will not be provided again.

The image capturing units 10f, 10g are telephoto image capturing units configured with light-folding element(s), the image capturing units 10h, 10i are telephoto image capturing units, the image capturing units 10j, 10k are wide angle image capturing units, the image capturing units 10m, 10n are ultra-wide-angle image capturing units, and the image capturing unit 10p is a ToF image capturing unit. The image capturing units 10f, 10g with light-folding element(s) may respectively have a configuration, for example, similar to that as shown in FIG. 23, FIG. 24 or FIG. 25, and a description in this regard will not be provided again. In this embodiment, the image capturing units 10f, 10g, 10h, 10i, 10j, 10k, 10m, 10n, 10p have different fields of view, such that the electronic device 30 has various magnification ratios so as to meet the requirement of optical zoom functionality. The electronic device 30 includes multiple image capturing units 10f, 10g, 10h, 10i, 10j, 10k, 10m, 10n, 10p, but the present disclosure is not limited to the number and arrangement of image capturing units.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the image capturing lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-12 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system comprising three lens groups, the three lens groups comprising five lens elements, the three lens groups being, in order from an object side to an image side along an optical path, a first lens group, a second lens group and a third lens group, the five lens elements being, in order from the object side to the image side along the optical path, a first lens element, a second lens element, a third lens element, a fourth lens element and a fifth lens element, and each of the five lens elements having an object-side surface facing toward the object side and an image-side surface facing toward the image side;

wherein a total number of lens elements in the image capturing lens system is five, at least one lens element in the first lens group, the second lens group and the third lens group has at least one inflection point in an off-axis region thereof, a focal length of the image capturing lens system is varied by changing axial distances between the three lens groups in a zooming process, the image capturing lens system has a long-focal-length end and a short-focal-length end, and the second lens group is moved relative to the first lens group along an optical axis in the zooming process;

wherein the first lens group comprises the first lens element and the second lens element, the second lens group comprises the third lens element, and the third lens group comprises the fourth lens element and the fifth lens element;

wherein an Abbe number of one of the five lens elements is Vi, a refractive index of the one of the five lens elements is Ni, a minimum value of Vi/Ni is (Vi/Ni) min, half of a maximum field of view of the image capturing lens system at the short-focal-length end is HFOVS, a maximum distance between an optically effective area of the object-side surface of the first lens element and the optical axis when the image capturing lens system is at the long-focal-length end is Y11L, a maximum distance between an optically effective area of the object-side surface of the first lens element and the optical axis when the image capturing lens system is at the short-focal-length end is Y11S, a maximum distance between an optically effective area of the image-side surface of the fifth lens element and the optical axis when the image capturing lens system is at the long-focal-length end is Y52L, a maximum distance between an optically effective area of the image-side surface of the fifth lens element and the optical axis when the image capturing lens system is at the short-focal-length end is Y52S, and the following conditions are satisfied:

$7.5<(Vi/Ni)min<12.3$;

$5.0$ degrees$<$HFOVS$<25.0$ degrees;

$0.50<Y11L/Y52L<2.0$; and $0.50<Y11S/Y52S<2.0$.

2. The image capturing lens system of claim 1, wherein the second lens group is moved along the optical axis toward the object side relative to the first lens group when the image capturing lens system is zooming from the short-focal-length end to the long-focal-length end.

3. The image capturing lens system of claim 1, wherein a focal length of the image capturing lens system at the long-focal-length end is fL, a focal length of the image capturing lens system at the short-focal-length end is fS, and the following condition is satisfied:

$1.45<fL/fS<3.10$.

4. The image capturing lens system of claim 1, wherein an axial distance between the object-side surface of the first lens element and an image surface when the image capturing lens system is at the long-focal-length end is TLL, a focal length of the image capturing lens system at the long-focal-length end is fL, an f-number of the image capturing lens system at the short-focal-length end is FnoS, and the following conditions are satisfied:

$0.80<TLL/fL<1.8$; and $2.2<FnoS<3.8$.

5. The image capturing lens system of claim 1, wherein the object-side surface of the first lens element is convex in a paraxial region thereof, and the image-side surface of the second lens element is concave in a paraxial region thereof.

6. The image capturing lens system of claim 1, wherein the second lens group has positive refractive power;

wherein a focal length of the image capturing lens system at the short-focal-length end is fS, a focal length of the second lens group is fG2, and the following condition is satisfied:

$0.70<fS/fG2<2.4$.

7. An image capturing unit, comprising:

the image capturing lens system of claim 1; and an image sensor disposed on an image surface of the image capturing lens system.

8. An electronic device, comprising at least two image capturing units located on a same side of the electronic device, and the at least two image capturing units comprising:

a first image capturing unit, comprising the image capturing lens system of claim 1 and an image sensor disposed on an image surface of the image capturing lens system; and a second image capturing unit, comprising an optical lens assembly and an image sensor disposed on an image surface of the optical lens assembly;

wherein half of a maximum field of view of the second image capturing unit ranges between 30 degrees and 60 degrees.

9. An image capturing lens system comprising three lens groups, the three lens groups comprising five lens elements, the three lens groups being, in order from an object side to an image side along an optical path, a first lens group, a second lens group and a third lens group, the five lens elements being, in order from the object side to the image side along the optical path, a first lens element, a second lens element, a third lens element, a fourth lens element and a fifth lens element, and each of the five lens elements having an object-side surface facing toward the object side and an image-side surface facing toward the image side;

wherein a total number of lens elements in the image capturing lens system is five, at least one lens element in the first lens group, the second lens group and the third lens group has at least one inflection point in an off-axis region thereof, a focal length of the image capturing lens system is varied by changing axial distances between the three lens groups in a zooming process, the image capturing lens system has a long-focal-length end and a short-focal-length end, and the second lens group is moved relative to the first lens group along an optical axis in the zooming process;

wherein the third lens element has positive refractive power;

wherein an Abbe number of one of the five lens elements is Vi, a refractive index of the one of the five lens elements is Ni, a minimum value of Vi/Ni is (Vi/Ni)min, half of a maximum field of view of the image capturing lens system at the short-focal-length end is HFOVS, a maximum distance between an optically effective area of the object-side surface of the first lens element and the optical axis when the image capturing lens system is at the long-focal-length end is Y11L, a maximum distance between an optically effective area of the object-side surface of the first lens element and the optical axis when the image capturing lens system is at the short-focal-length end is Y11S, a maximum distance between an optically effective area of the image-side surface of the fifth lens element and the optical axis when the image capturing lens system is at the long-focal-length end is Y52L, a maximum distance between an optically effective area of the image-side surface of the fifth lens element and the optical axis when the image capturing lens system is at the short-focal-length end is Y52S, an axial distance between the object-side surface of the first lens element and an image surface when the image capturing lens system is at the long-focal-length end is TLL, an axial distance between the object-side surface of the first lens element and the image surface when the image capturing lens system is at the short-focal-length end is TLS, and the following conditions are satisfied:

$7.5<(Vi/Ni)min<12.3$;

$5.0$ degrees$<$HFOVS$<25.0$ degrees;

$0.50<Y11L/Y52L<2.0$; and $0.50<Y11S/Y52S<2.0$.

$TLL/TLS-1|<1.0E-2$.

10. The image capturing lens system of claim 9, wherein an Abbe number of the third lens element is V3, an Abbe number of the fourth lens element is V4, and the following condition is satisfied:

$1.5<V3/V4<5.0$.

11. The image capturing lens system of claim 9, wherein half of a maximum field of view of the image capturing lens system at the long-focal-length end is HFOVL, a focal length of the image capturing lens system at the long-focal-length end is fL, a focal length of the image capturing lens system at the short-focal-length end is fS, and the following conditions are satisfied:

$$3.0 \text{ degrees} < HFOVL < 10.0 \text{ degrees; and}$$

$$1.45 < fL/fS.$$

12. The image capturing lens system of claim 9, wherein at least one lens element in the first lens group, the second lens group and the third lens group is made of plastic material, the maximum distance between the optically effective area of the object-side surface of the first lens element and the optical axis when the image capturing lens system is at the long-focal-length end is Y11L, the maximum distance between the optically effective area of the object-side surface of the first lens element and the optical axis when the image capturing lens system is at the short-focal-length end is Y11S, a maximum image height of the image capturing lens system at the long-focal-length end is ImgHL, a maximum image height of the image capturing lens system at the short-focal-length end is ImgHS, and the following conditions are satisfied:

$$0.50 < Y11L/ImgHL < 2.7; \text{ and}$$

$$0.50 < Y11S/ImgHS < 2.7.$$

13. The image capturing lens system of claim 9, further comprising an aperture stop and a light-folding element, wherein the aperture stop is disposed in the second lens group.

14. The image capturing lens system of claim 9, wherein the image capturing lens system focuses on an object in a focusing process as an object distance varies, and the third lens group is moved relative to the first lens group along the optical axis in the focusing process.

15. An image capturing lens system comprising three lens groups, the three lens groups comprising five lens elements, the three lens groups being, in order from an object side to an image side along an optical path, a first lens group, a second lens group and a third lens group, the five lens elements being, in order from the object side to the image side along the optical path, a first lens element, a second lens element, a third lens element, a fourth lens element and a fifth lens element, and each of the five lens elements having an object-side surface facing toward the object side and an image-side surface facing toward the image side;

wherein a total number of lens elements in the image capturing lens system is five, at least one lens element in the first lens group, the second lens group and the third lens group has at least one inflection point in an off-axis region thereof, a focal length of the image capturing lens system is varied by changing axial distances between the three lens groups in a zooming process, the image capturing lens system has a long-focal-length end and a short-focal-length end, and the second lens group is moved relative to the first lens group along an optical axis in the zooming process;

wherein the third lens element has positive refractive power;

wherein an Abbe number of one of the five lens elements is Vi, a refractive index of the one of the five lens elements is Ni, a minimum value of Vi/Ni is (Vi/Ni) min, half of a maximum field of view of the image capturing lens system at the short-focal-length end is HFOVS, a maximum distance between an optically effective area of the object-side surface of the first lens element and the optical axis when the image capturing lens system is at the long-focal-length end is Y11L, a maximum distance between an optically effective area of the object-side surface of the first lens element and the optical axis when the image capturing lens system is at the short-focal-length end is Y11S, a maximum distance between an optically effective area of the image-side surface of the fifth lens element and the optical axis when the image capturing lens system is at the long-focal-length end is Y52L, a maximum distance between an optically effective area of the image-side surface of the fifth lens element and the optical axis when the image capturing lens system is at the short-focal-length end is Y52S, and the following conditions are satisfied:

$$7.5 < (Vi/Ni)\text{min} < 12.3;$$

$$5.0 \text{ degrees} < HFOVS < 20.0 \text{ degrees;}$$

$$0.50 < Y11L/Y52L < 2.0; \text{ and}$$

$$0.50 < Y11S/Y52S < 2.0.$$

16. The image capturing lens system of claim 15, wherein the third lens group is moved relative to the first lens group along the optical axis in the zooming process.

17. The image capturing lens system of claim 15, wherein the maximum distance between the optically effective area of the object-side surface of the first lens element and the optical axis when the image capturing lens system is at the long-focal-length end is Y11L, the maximum distance between the optically effective area of the object-side surface of the first lens element and the optical axis when the image capturing lens system is at the short-focal-length end is Y11S, the maximum distance between the optically effective area of the image-side surface of the fifth lens element and the optical axis when the image capturing lens system is at the long-focal-length end is Y52L, the maximum distance between the optically effective area of the image-side surface of the fifth lens element and the optical axis when the image capturing lens system is at the short-focal-length end is Y52S, a focal length of the image capturing lens system at the long-focal-length end is fL, a focal length of the image capturing lens system at the short-focal-length end is fS, and the following conditions are satisfied:

$$0.55 < Y11L/Y52L < 1.8;$$

$$0.55 < Y11S/Y52S < 1.8; \text{ and}$$

$$1.45 < fL/fS.$$

18. The image capturing lens system of claim 15, wherein an axial distance between a most object-side surface and a most image-side surface of the first lens group is TG1, an axial distance between a most object-side surface and a most image-side surface of the third lens group is TG3, and the following condition is satisfied:

$$0.50 < TG1/TG3 < 2.0.$$

19. The image capturing lens system of claim 15, wherein the object-side surface of the first lens element is convex in a paraxial region thereof, the image-side surface of the second lens element is concave in a paraxial region thereof, and the object-side surface of the third lens element is convex in a paraxial region thereof.

20. The image capturing lens system of claim 15, wherein each of at least two lens elements in the first lens group, the second lens group and the third lens group has at least one inflection point in an off-axis region thereof.

* * * * *